US008340847B2

(12) United States Patent
Sako et al.

(10) Patent No.: US 8,340,847 B2
(45) Date of Patent: Dec. 25, 2012

(54) NAVIGATION CONTROL SYSTEM FOR SHIP

(75) Inventors: Hitoshi Sako, Kobe (JP); Yasuhiko Ishida, Kobe (JP)

(73) Assignee: Mitsubishi Electric Corp., Tokyo (JP)

( * ) Notice: Subject to any disclaimer, the term of this patent is extended or adjusted under 35 U.S.C. 154(b) by 262 days.

(21) Appl. No.: 12/947,412

(22) Filed: Nov. 16, 2010

(65) Prior Publication Data

US 2012/0010766 A1 Jan. 12, 2012

(30) Foreign Application Priority Data

May 13, 2010 (JP) ................................ 2010-111015

(51) Int. Cl.
*B60L 3/00* (2006.01)

(52) U.S. Cl. ........................................................ 701/21
(58) Field of Classification Search ..................... 701/21
See application file for complete search history.

(56) References Cited

FOREIGN PATENT DOCUMENTS

| | | |
|---|---|---|
| JP | 2004-142538 A | 5/2004 |
| JP | 2008-087736 A | 4/2008 |

*Primary Examiner* — Thomas Tarcza
*Assistant Examiner* — Maceeh Anwari
(74) *Attorney, Agent, or Firm* — Sughrue Mion, PLLC

(57) ABSTRACT

To propose a ship navigation control system that can easily and automatically switch between a target throttle opening for constant velocity navigation control and a target throttle opening corresponding to a lever operation amount of an operation lever. Throttle control means includes first computation means that computes a first target throttle opening for constant velocity navigation control of a ship based on a constant velocity navigation command using at least a ship velocity signal and a target ship velocity command signal, second computation means that computes a second target throttle opening corresponding to the lever operation amount, and a selection and output means that selects one having a smaller value of the first target throttle opening and the second target throttle opening and outputs the one as a throttle opening.

7 Claims, 14 Drawing Sheets

NAVIGATION CONTROL SYSTEM FOR SHIP

BACKGROUND OF THE INVENTION

1. Field of the Invention

The present invention relates to a navigation control system for a ship including a ship body having an operator seat and at least one outboard motor containing an engine, and specifically, to a navigation control system including constant velocity navigation control of the ship.

2. Description of the Related Art

In JP2008-87736A or JP2004-142538A, a navigation control system for a ship including a ship body having an operator seat and at least one outboard motor containing an engine is disclosed. The ship is a small type ship, for example, such as a motorboat. In JP2008-87736A, the outboard motor has a throttle actuator that controls a throttle opening of the engine, a shift actuator that controls a shift position, and an engine control module, and the engine control module controls the throttle actuator and the shift actuator. Further, near the operator seat of the ship body, operation amount computing means is provided. The operation amount computing means detects an operation state based on an operation input from an operator and computes control command values containing start and stop of the outboard motor, the throttle opening, and the shift position. The operation amount computing means transmits the control command values to the outboard motor via communication means, and the outboard motor controls the start and stop of the engine, the throttle opening, and the shift position based on the received control command value. However, JP2008-87736A does not disclose constant velocity navigation control of the ship.

JP2004-142538A discloses a propulsion control apparatus containing constant velocity navigation control of a ship. JP2004-142538A discloses switching from a constant velocity navigation mode to a normal navigation mode, and, at the switching from the constant velocity navigation mode to the normal navigation mode, the constant velocity navigation control is cancelled and switched to the normal navigation control.

Since the navigation control system disclosed in JP2008-87736A does not contain constant velocity navigation control, even when the engine revolution speed of the outboard motor is constant, the ship velocity against to the ground is continuously affected by water flow and waves and changes in traveling on water, the ship velocity changes due to slight turn by steering, and thus, the constant velocity is not sustainable. Under the circumstances, when navigation is performed while the constant velocity is sustained, it is necessary for the operator to adjust the ship velocity by operating an operation lever corresponding to the outboard motor and adjusting the engine revolution speed of the outboard motor based on information from a ship velocity meter. Thus, the operation by the operator becomes complex and the proficiency of the operator is necessary. Since the navigation control system disclosed in JP2008-87736A does not contain constant velocity navigation control, when accurate navigation of a predetermined distance is performed in a predetermined time, as described above, there are problems that the complex operation of the operation lever is necessary for the operator and the arrival may be late for a predetermined time due to the influence of water flow at navigation with the amount of lever operation of the operation lever fixed constant. Further, in a small type ship such as a motorboat, sometimes the boat tows a water ski or a wakeboard while turning or slaloming at a fixed velocity, and a skilled operation technique for the operation lever of the operator is necessary. Thus, there is a problem that the operation of the motorboat is difficult for a beginner having a poor operation technique.

According to the constant velocity navigation control disclosed in JP2004-142538A, the operation of the operation lever at constant velocity navigation can be simplified. However, in the propulsion control apparatus of JP2004-142538A, for example, when the constant velocity navigation mode is switched to the normal navigation mode for dealing with an emergency that a player of water ski or wakeboard towed by the ship falls into the water or the like, the constant velocity navigation mode is cancelled, and therefore, it is difficult to easily perform the control of returning from the normal navigation mode to the constant velocity navigation mode. If the ship velocity is excessively increased by the operation lever in the normal navigation mode, the ship may be in danger of runaway.

SUMMARY OF THE INVENTION

The invention is to provide a navigation control system for a ship that can improve the above described problems in JP2004-142538A.

In a navigation control system for a ship according to the invention, including a ship body having an operator seat, and at least one outboard motor containing an engine, the outboard motor has a throttle actuator that controls a throttle opening of the engine and an engine control module that controls the throttle actuator, the ship body is provided with a ship control module connected to the engine control module, a ship velocity detecting unit that generates a ship velocity signal representing a ship velocity of the ship body, a constant velocity navigation commanding unit that generates a constant velocity navigation command, a target ship velocity commanding unit that outputs a target ship velocity command signal, and an operation lever that controls the throttle opening of the engine, the constant velocity navigation commanding unit, the target ship velocity commanding unit, and the operation lever are placed near the operator seat for operation by the operator, the operation lever is provided with a lever operation amount detecting unit that detects a lever operation amount, the ship velocity detecting unit, the constant velocity navigation commanding unit, the target ship velocity commanding unit, and the lever operation amount detecting unit are connected to the ship control module, the ship control module includes throttle control means that controls the throttle actuator through the engine control module, and the throttle control means includes first computation means that computes a first target throttle opening for constant velocity navigation control of the ship based on the constant velocity navigation command using at least the ship velocity signal and the target ship velocity command signal, second computation means that computes a second target throttle opening corresponding to the lever operation amount, and selection and output means that selects one having a smaller value of the first target throttle opening and the second target throttle opening and outputs the one as a throttle opening.

In the navigation control system for the ship according to the invention, the throttle control means includes the first computation means that computes the first target throttle opening for the constant velocity navigation control of the ship based on the constant velocity navigation command using at least the ship velocity signal and the target ship velocity command signal, the second computation means that computes the second target throttle opening corresponding to the lever operation amount, and the selection and output means that selects one having the smaller value of the first target throttle opening and the second target throttle opening and outputs the one as the throttle opening.

Therefore, in order to deal with an emergency, for example, by decreasing the lever operation amount, the state in which the first target throttle opening is selected as the target throttle opening can automatically be switched to the state in which the second target throttle opening is selected as the target throttle opening. Further, after dealing with the emergency is ended, for example, by increasing the lever operation amount, the second target throttle opening becomes larger than the first target throttle opening, the first target throttle opening can automatically be selected as the target throttle opening again, and the constant velocity navigation control can easily be restored. In addition, after dealing with the emergency is ended, for example, even if the second target throttle opening becomes larger, when the second target throttle opening becomes larger than the first target throttle opening, the first target throttle opening can be selected as the target throttle opening, and thus, the danger of runaway of the ship can be prevented.

Further, for an existing ship including the navigation control system disclosed in JP2008-87736A, the constant navigation control of the invention may be possible by the change of the ship control module, and improvements of the ship control function can easily be realized at low cost without the necessity of the change of the outboard motor.

The foregoing and other object, features, aspects, and advantages of the present invention will become more apparent from the following detailed description of the present invention when taken in conjunction with the accompanying drawings.

DETAILED DESCRIPTION

Hereinafter, embodiments of a navigation control system for a ship according to the invention will be explained with reference to the drawings.

Embodiment 1

Figure 1:
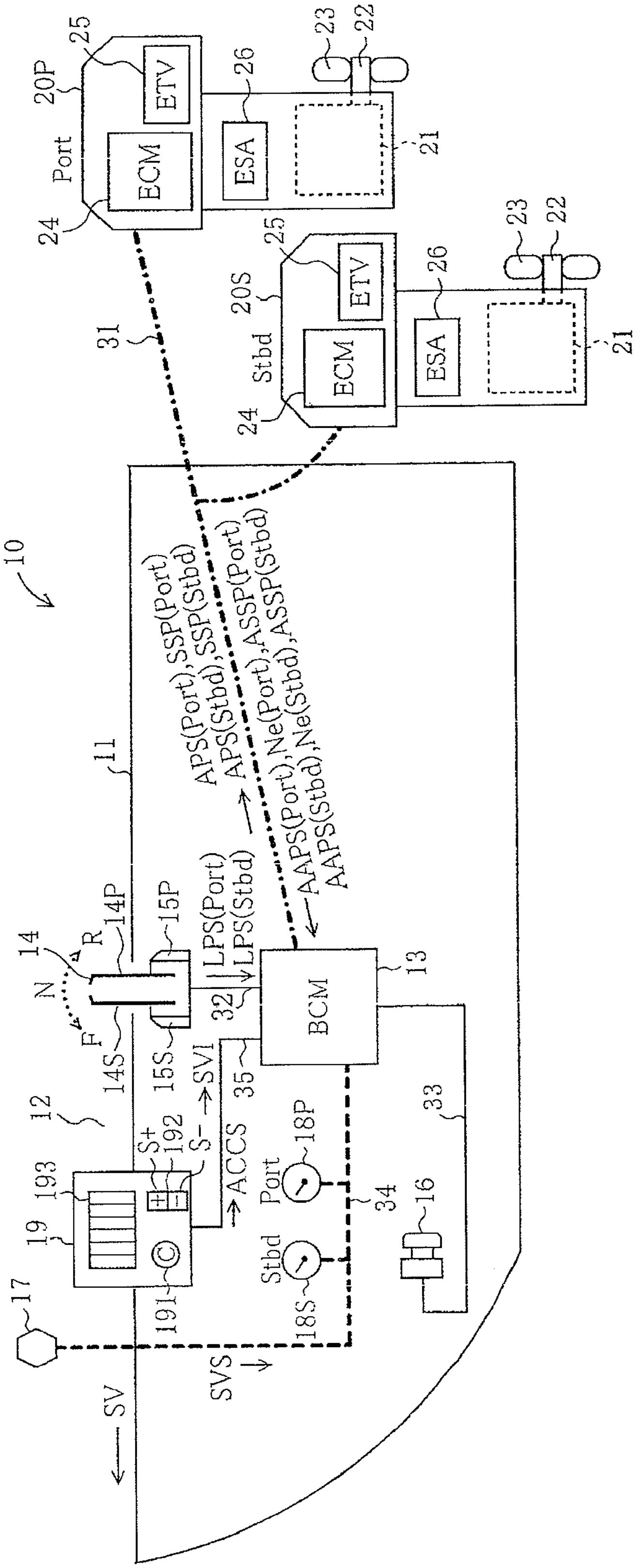
FIG. 1 is an overall configuration diagram showing embodiment 1 of a ship navigation control system according to the invention.

FIG. 1 is an overall configuration diagram showing embodiment 1 of the ship navigation control system according to the invention.

(1) Explanation of Overall Configuration of Embodiment 1

The overall configuration of the ship navigation control system according to embodiment 1 will be explained with reference to FIG. 1. In FIG. 1, a ship 10 includes a ship body 11, and two outboard motors 20P, 20S mounted on the stern of the ship body 11. The ship body 11 includes no engine and the two outboard motors 20P, 20S each has an engine 21 inside. The ship 10 is driven by the engines 21 in the two outboard motors 20P, 20S, provided with propulsion power by the two outboard motors 20P, 20S, and navigated.

The ship 10 is a small type ship such as a motorboat, for example, and the ship body 11 includes an operator seat 12. The ship 10 is used for water skiing or wakeboarding, for example, and turns and slaloms on the water. Of the two outboard motors 20P, 20S, the outboard motor 20P at the port side, i.e., at the left side in the traveling direction is called a port (Port), and the outboard motor 20S at the starboard side, i.e., at the right side in the traveling direction is called a starboard (Stbd).

The port 20P and the starboard 20S have the same configuration. The port 20P and the starboard 20S are propulsion motors each having the engine 21 inside and integrally including the engine 21, a propeller shaft 22, a propulsion propeller 23, etc. The port 20P and the starboard 20S respectively drive the propulsion propellers 23 through the propeller shafts 22 by the built-in engines 21, and provides propulsion power to the ship 10.

The port 20P and the starboard 20S each has an engine control module (ECM) 24, a throttle actuator (ETV) 25, a shift actuator (ESA) 26. The throttle actuator 25 controls the throttle opening of the corresponding engine 21, and controls the amount of intake mixture of air and fuel for the corresponding engine 21. The shift actuator 26 controls the shift position with respect to a gear mechanism attached to the corresponding engine 21. The shift position is controlled in three positions including a neutral position N, a forward position F, and a rearward position R. The engine control module 24 is specifically formed using a microcomputer and controls the corresponding throttle actuator 25 and shift actuator 26.

At the operator seat 12 of the ship body 11, a ship control module (BCM) 13, an operation lever 14, a start and stop command switch 16, a ship velocity sensor 17, information display meters 18P, 18S, and an automatic cruise control panel 19 are provided. The operation lever 14, the command switch 16, and the automatic cruise control panel 19 are provided near the operator seat 12 because they are operated by an operator. The information display meters 18P, 18S are provided near the operator seat 12 because they are monitored by the operator. The ship control module 13 and the ship velocity sensor 17 are not necessarily provided near the operator seat 12, but provided somewhere in the ship body 11. In embodiment 1, they are around the operator seat 12.

The ship control module 13 is specifically formed using a microcomputer and connected to the engine control modules 24 of the port 20P and the starboard 20S via a control system communication line 31 using CAN (Controller Area Network). The ship control module 13 supplies control command values, specifically, a target throttle opening APS (Port), a target shift position SSP (Port), and start and stop commands to the engine control module 24 of the port 20P. The engine control module 24 of the port 20P is connected to the corresponding throttle actuator 25 and the corresponding shift actuator 26, and controls the corresponding engine 21 to the target throttle opening APS (Port) and the target shift position SSP (Port) through these throttle actuator 25 and shift actuator 26, and starts and stops the corresponding engine 21.

Further, the engine control module 24 of the port 20P detects a real throttle opening AAPS (Port) representing the real throttle opening in the engine 21, a real engine revolution speed Ne (port) representing the real revolution speed of the engine 21, and a real shift position ASSP (Port) representing the real shift position of the gear mechanism of the engine 21, and outputs these real throttle opening AAPS (Port), real engine revolution speed Ne (port), and real shift position ASSP (Port) to the ship control module 13. The ship control module 13 performs reflection on the control command values for these engine 21 of the port 20P and system monitoring based on the real throttle opening AAPS (Port), real engine revolution speed Ne (port), and real shift position ASSP (Port).

Similarly, the ship control module 13 supplies control command values, specifically, a target throttle opening APS (Stbd), a target shift position SSP (Stbd), and start and stop commands to the engine control module 24 of the starboard 20S. The engine control module 24 of the starboard 20S is connected to the corresponding throttle actuator 25 and the corresponding shift actuator 26, and controls the corresponding engine 21 to the target throttle opening APS (Stbd) and the target shift position SSP (Stbd) through these throttle actuator 25 and shift actuator 26, and starts and stops the corresponding engine 21.

Further, the engine control module 24 of the starboard 20S detects a real throttle opening AAPS (Stbd) representing the real throttle opening in the engine 21, a real engine revolution speed Ne (Stbd) representing the real revolution speed of the engine 21, and a real shift position ASSP (Stbd) representing the real shift position of the gear mechanism of the engine 21, and outputs these real throttle opening AAPS (Stbd), real engine revolution speed Ne (Stbd), and real shift position ASSP (Stbd) to the ship control module 13. The ship control module 13 performs reflection on the control command values for the engine 21 of the starboard 20S and system monitoring based on these real throttle opening AAPS (Stbd), real engine revolution speed Ne (Stbd), and real shift position ASSP (Stbd).

The operation lever 14 is operated by the operator, determines the throttle openings for the respective engines 21 of the port 20P and the starboard 20S, and determines the shift positions of the gear mechanisms attached to the respective engines 21. The operation lever 14 has a pair of opposed lever members 14P, 14S, and adapted so that the operator operates the pair of lever members 14P, 14S simultaneously to each other in the same amount of lever operation. The lever members 14P, 14S correspond to the port 20P and the starboard 20S, respectively. To the lever members 14P, 14S, lever operation amount detecting units 15P, 15S are attached, respectively. The lever operation amount detecting unit 15P detects the lever operation amount LPS (Port) of the lever member 14P corresponding to the port 20P and outputs the lever operation amount LPS (Port). The lever operation amount detecting unit 15S detects the lever operation amount LPS (Stbd) of the lever member 14S corresponding to the starboard 20S and outputs the lever operation amount LPS (Stbd). The lever operation amount detecting units 15P, 15S are connected to the ship control module 13 via a signal line 32.

The lever operation amounts LPS (Port), LPS (Stbd) determine the throttle openings and the shift positions of the respective engines 21 of the port 20P and the starboard 20S. The lever members 14P, 14S of the operation lever 14 determine the throttle openings at forward movement between the neutral position N at the center and the forward position F at the left end, and further, determine the throttle openings at rearward movement between the neutral position N and the rear position R at the right end. The lever operation amounts LPS (Port), LPS (Stbd) represent the throttle openings corresponding to the lever positions of the lever members 14P, 14S, and are supplied to the ship control module 13. The lever operation amounts LPS (Port), LPS (Stbd) are also used for determination of the shift positions for the gear mechanisms attached to the respective engines 21 of the port 20P and the starboard 20S.

The start and stop command switch 16 is operated by the operator and connected to the ship control module 13 through a signal line 33. The ship control module 13 issues commands to start and stop the corresponding engines 21 through the respective engine control modules 24 of the respective outboard motors 20P, 20S based on the operation of the start and stop command switch 16.

The velocity sensor 17 and information display meters 18P, 18S are connected to the ship control module 13 via an information communication line 34 using CAN. The velocity sensor 17 is formed using a global positioning system, i.e., GPS, and generates a ship velocity signal SVS representing a navigation velocity of the ship 10, i.e., ship velocity SV, and supplies the ship velocity signal SVS to the ship control module 13. The information display meters 18P, 18S display information of the real engine revolution velocities Ne (Port), Ne (Stbd) of the respective engines 21 of the port 20P and the starboard 20S from the respective engine control modules 24 of the ports 20P, 20S through the ship control module 13.

The automatic cruise control panel 19 includes a constant velocity navigation commanding unit 191, a target ship velocity commanding unit 192, and a ship velocity indicator 193, and is connected to the ship control module 13 via a signal line 35. The constant velocity navigation commanding unit 191 is specifically constructed by an ACC switch and is operated by the operator. The ACC switch 191 outputs an ACC switch signal ACCS and the ACC switch signal ACCS is supplied to the ship control module 13. The ACC switch 191 issues a constant velocity navigation command ACCI when first pressed down by the operator for a constant velocity navigation control ACC, and, when pressed down by the operator again under the condition that the constant velocity navigation command ACCI has been issued, cancels the constant velocity navigation command ACCI.

The target ship velocity commanding unit 192 is constructed by a target ship velocity command switch, and is operated by the operator. The target ship velocity command switch 192 has a plus switch S+ and a minus switch S−, and supplies a target ship velocity command signal SVI to the ship control module 13. The plus switch S+ functions to increase the target ship velocity command signal SVI by a unit amount of increase at each time when pressed down, and the minus switch S− functions to decrease the target ship velocity command signal SVI by a unit amount of decrease at each time when pressed down. The ship velocity indicator 193 indicates the current ship velocity SV or the target ship velocity SVT to the operator through the ship control module 13.

(2) Explanation of Overall Configuration of Navigation Control Portion 300 of Ship Control Module 13

Figure 2:
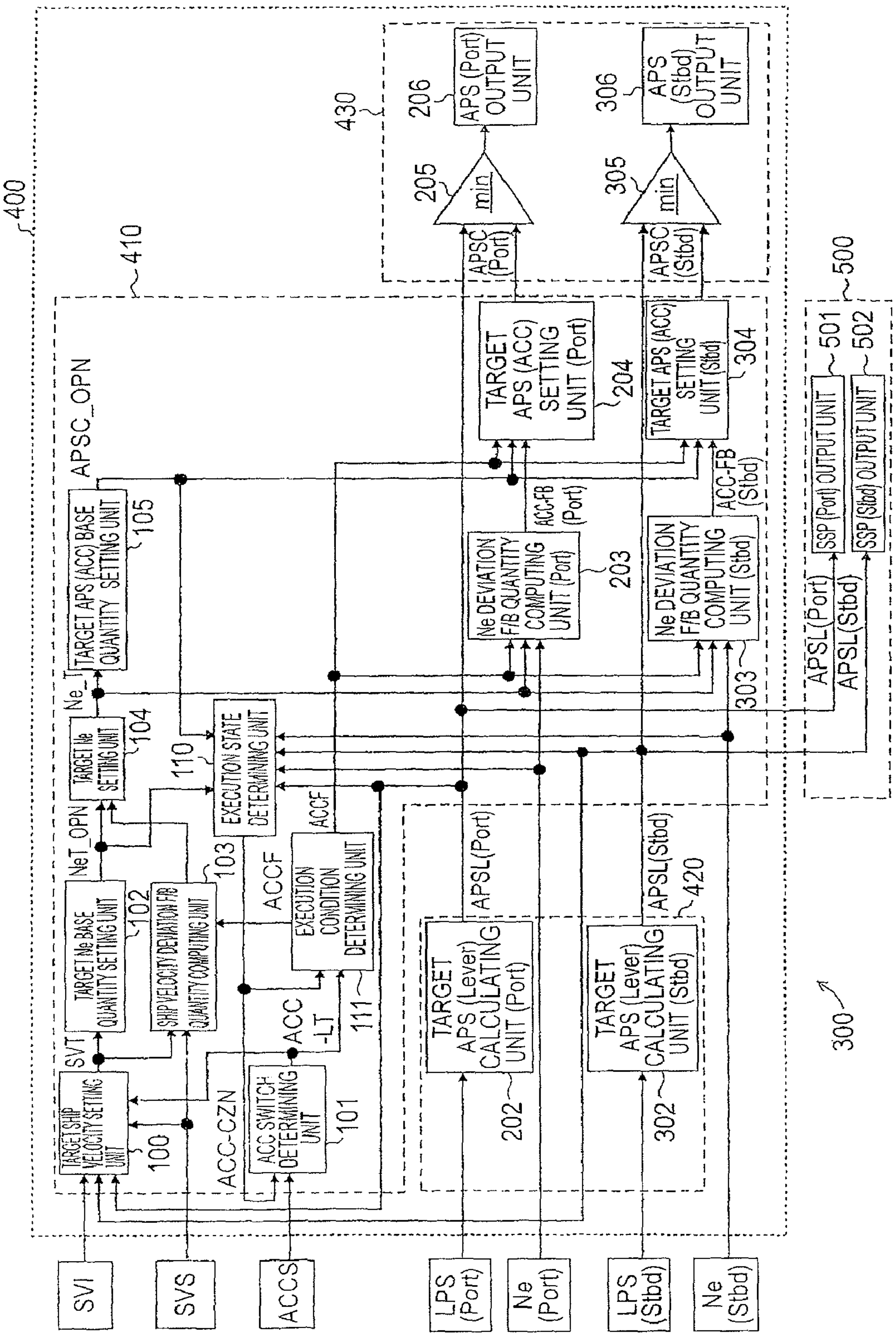
FIG. 2 is a block diagram showing a navigation control portion of a ship control module in embodiment 1.

FIG. 2 is a block diagram showing a navigation control portion 300 of the ship control module 13. The navigation control portion 300 includes throttle control means 400 and shift control means 500. At the left end of FIG. 2, the target ship velocity command signal SVI from the target ship velocity navigation commanding unit 192, the ship velocity signal SVS from the ship velocity sensor 17, the ACC switch signal ACCS from the constant velocity navigation commanding unit 191, the lever operation amount LPS (Port) from the lever operation amount detecting unit 15P, the real engine revolution speed Ne (Port) from the engine control module 24 of the port 20P, the lever operation amount LPS (Stbd) from the lever operation amount detecting unit 15S, the real engine revolution speed Ne (Stbd) from the engine control module 24 of the starboard 20S are indicated. They are used in the navigation control portion 300.

As shown in FIG. 2, the throttle control means 400 outputs a target throttle opening APS (Port) for the port 20P and a target throttle opening APS (Stbd) for the starboard 20S based on the target ship velocity command signal SVI, the ship velocity signal SVS, the ACC switch signal ACCS, the lever operation amount LPS (Port), the real engine revolution speed Ne (Port), the lever operation amount LPS (Stbd), and the real engine revolution speed Ne (Stbd). The shift control means 500 outputs a shift position SSP (Port) for the port 20P and a shift position SSP (Stbd) for the starboard 20S.

(3) Explanation of Overall Configuration of Throttle Control Means 400 of Navigation Control Portion 300

The throttle control means 400 characterizes the ship navigation control system according to embodiment 1 of the invention. The throttle control means 400 includes first computation means 410, second computation means 420, and select and output means 430 as features of the invention as shown in FIG. 2. The first computation means 410 computes a first target throttle opening APSC (Port) for the port 20P and a first target throttle opening APSC (Stbd) for the starboard 20S, and outputs the first target throttle openings APSC (Port), APSC (Stbd) under the condition that the constant velocity navigation control ACC of the ship 10 has been permitted. The second computation means 420 computes a second target throttle opening APSL (Port) for the port 20P and a second target throttle opening APSL (Stbd) for the starboard 20S in response to the lever operation amount LPS (Port) of the lever member 14P of the operation lever 14 and the lever operation amount LPS (Stbd) of the lever member 14S, and outputs the second target throttle openings APSL (Port), APSL (Stbd). The select and output means 430 selects one having a smaller value from the first target throttle opening APSC (Port) and the second target throttle opening APSL (Port) for the port 20P, and outputs a target throttle opening APS (Port), and selects one having a smaller value from the first target throttle opening APSC (Stbd) and the second target throttle opening APSL (Stbd) for the starboard 20S, and outputs a target throttle opening APS (Stbd).

In embodiment 1, the two outboard motors 20P, 20S are used, however, in the case where a single outboard motor is used, for example, the starboard 20S is not used but only the port 20P is used, the first computation means 410 outputs the first target throttle opening APSC (Port) for the port 20P, the second computation means 420 outputs the second target throttle opening APSL (Port) for the port 20P, and the select and output means 430 outputs the target throttle opening APS (Port) for the port 20P.

The throttle control means 400 has the first computation means 410, the second computation means 420, and the select and output means 430, and the select and output means 430 selects ones having the smaller values from the first target throttle openings APSC (Port), APSC (Stbd) and the second target throttle openings APSL (Port), APSL (Stbd) and outputs the target throttle openings APS (Port), APS (Stbd).

Therefore, in order to deal with an emergency, for example, by decreasing the lever operation amounts LPS (Port), LPS (Stbd), the state in which the first target throttle openings APSC (Port), APSC (Stbd) are selected as the target throttle openings APS (Port), APS (Stbd) can automatically be switched to the state in which the second target throttle openings APSL (Port), APSL (Stbd) are selected as the target throttle openings APS (Port), APS (Stbd). Further, after dealing with the emergency is ended, for example, by increasing the lever operation amounts LPS (Port), LPS (Stbd), the second target throttle openings APSL (Port), APSL (Stbd) become larger than the first target throttle openings APSC (Port), APSC (Stbd), the first target throttle openings APSC (Port), APSC (Stbd) can automatically be selected as the target throttle openings APS (Port), APS (Stbd) again, and the constant velocity navigation control ACC can easily be restarted. In addition, after dealing with the emergency is ended, for example, even if the second target throttle openings APSL (Port), APSL (Stbd) become larger, when the second target throttle openings APSL (Port), APSL (Stbd) become larger than the first target throttle openings APSC (Port), APSC (Stbd), the first target throttle openings APSC (Port), APSC (Stbd) can be selected as the target throttle openings APS (Port), APS (Stbd), and thus, the danger of runaway of the ship can be prevented.

Now, the first computation means 410, the second computation means 420, and the select and output means 430 in FIG. 2 will sequentially be explained in detail.

(4) Explanation of Overall Configuration of First Computation Means 410 of Throttle Control Means 400

First, the overall configuration of the first computation means 410 will be explained with reference to FIG. 2. As shown in FIG. 2, the first computation means 410 includes a target ship velocity setting unit 100, an ACC switch determining unit 101, a target Ne base quantity setting unit 102, a ship velocity deviation F/B quantity computing unit 103, a target Ne setting unit 104, a target APS (ACC) base quantity setting unit 105, an execution state determining unit 110, an execution condition determining unit 111, an Ne deviation F/B quantity computing unit (Port) 203, an Ne deviation F/B quantity computing unit (Stbd) 303, a target APS (ACC) setting unit (Port) 204, and a target APS (ACC) setting unit (Stbd) 304. The target APS (ACC) setting unit (Port) 204 outputs the first target throttle opening APSC (Port) for the port 20P, and the target APS (ACC) setting unit (Stbd) 304 outputs the first target throttle opening APSC (Stbd) for the starboard 20S.

(4A) Explanation of Target Ship Velocity Setting Unit 100 of First Computation Means 410

The target ship velocity setting unit 100 of the first computation means 410 will be explained with reference to FIGS. 2 and 3. In the first computation means 410, the target ship velocity setting unit 100 sets the target ship velocity SVT and outputs the target ship velocity SVT. As shown in FIG. 2, the target ship velocity setting unit 100 receives the target ship velocity command signal SVI from the target ship velocity command switch 192, the second target throttle opening APSL (Port) from a target APS (Lever) calculating unit (Port) 202, the second target throttle opening APSL (Stbd) from a target APS (Lever) calculating unit (Stbd) 302, an ACC latch switch signal ACC-LT from the ACC switch determining unit 101, and the ship velocity signal SVS, and sets the target ship velocity SVT. The second target throttle opening APSL (Port) and the second target throttle opening APSL (Stbd) will be described in detail in section (5), and the ACC latch switch signal ACC-LT will be described in detail in section (4B).

Figure 3:
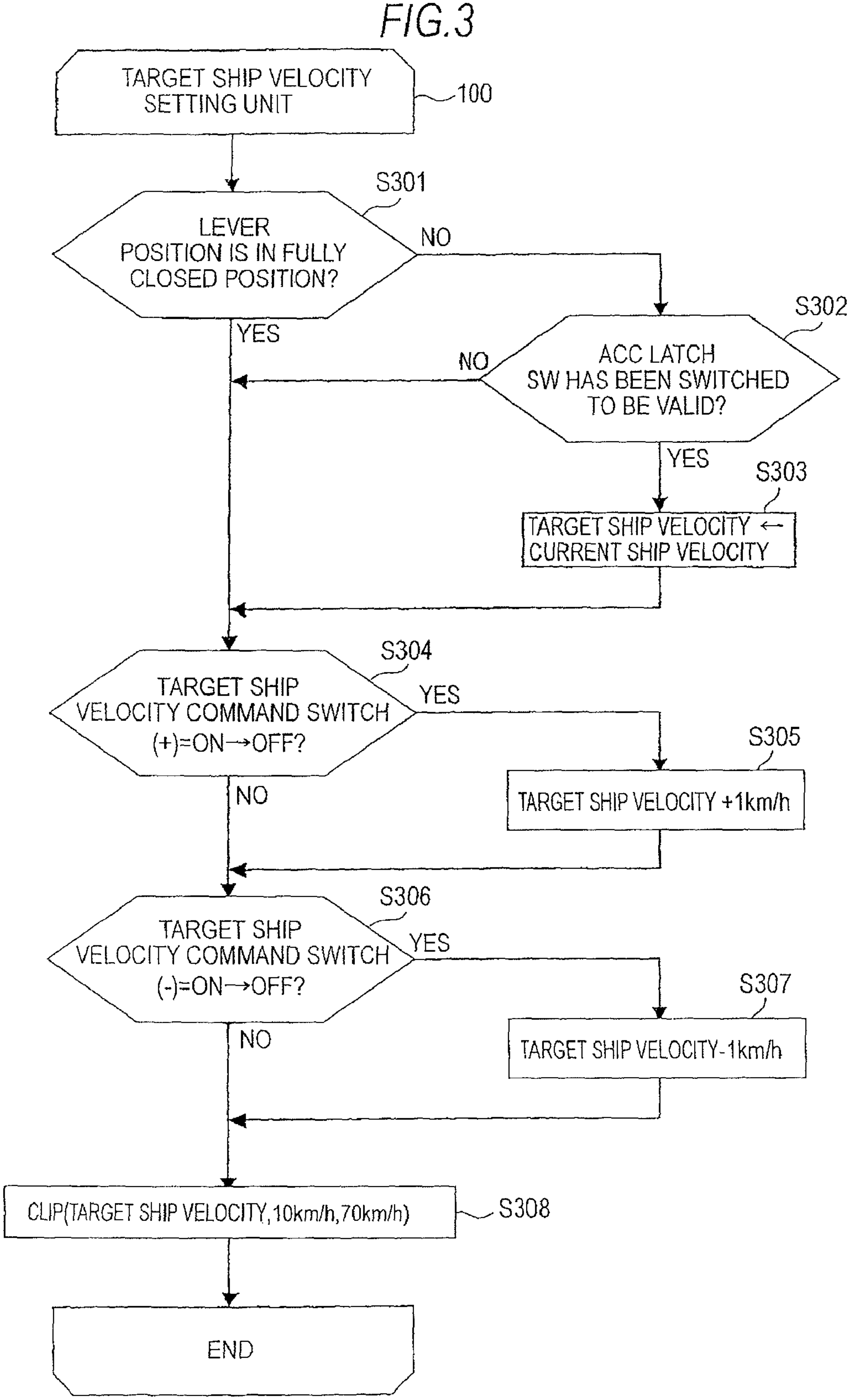
FIG. 3 is a flowchart showing a target ship velocity setting unit of first computation means in the navigation control portion of embodiment 1.

FIG. 3 shows a flowchart of the target ship velocity setting unit 100. This flowchart is repeatedly executed at short time intervals, specifically, 5 [msec]. The target ship velocity setting unit 100 includes steps S301 to S308. At step S301, whether the lever positions of the respective lever members 14P, 14S of the operation lever 14 are in the fully closed position or not is determined. At the step S301, whether the lever members 14P, 14S of the operation lever 14 are in the rearward fully closed position Rmin or forward fully closed position Fmin is determined based on the second target throttle openings APSL (Port), APSL (Stbd) output from the target APS (Lever) calculating unit (Port) 202 and the target APS (Lever) calculating unit (Stbd) 302. If the determination result is No, the process moves to step S302, and, if the determination result is Yes, the process moves to step S304.

At step S302, on the basis of the ACC latch switch signal ACC-LT from the ACC switch determining unit 101, whether the ACC latch switch signal ACC-LT has been switched to be valid from level 0 to level 1 or not is determined. The ACC latch switch signal ACC-LT is switched from level 0 to level 1 when the operator first presses down the ACC switch 191 for commanding the constant velocity navigation control ACC. The ACC latch switch signal ACC-LT becomes valid when turned to level 1, and the constant velocity navigation command ACCI is issued. At step S302, in other words, whether the constant velocity navigation command ACCI has been issued or not is determined based on the ACC switch signal ACCS. If the determination result at step S302 is Yes, the process moves to step S303, and, if the determination result is No, the process moves to step S304.

At step S303, in the ship velocity indicator 193, the current ship velocity SV to be displayed is replaced by the target ship velocity SVT based on the ship velocity signal SVS. At step S304, whether the plus switch S+ of the target ship velocity command switch 192 has been pressed down or not is determined based on the target ship velocity command signal SVI output from the target ship velocity command switch 192. Specifically, the plus switch S+ of the target ship velocity command switch 192 is pressed down and turned ON by the operator when the target ship velocity SVT is increased, and, after the pressing down operation, when the operator stops the pressing down operation, automatically returned to OFF, and thus, whether there has been a change from ON to OFF is determined. If the determination result at step S304 is Yes, the process moves to step S305, and, if the determination result is No, the process moves to step S306. At step S305, a unit amount of increase, for example, 1 [Km/h] is added to the target ship velocity SVT, and the process subsequently moves to step S306. When the operator increases the target ship velocity SVT, the plus switch S+ of the target ship velocity command switch 192 is repeatedly pressed down. Accordingly, at step S305, at each time when the plus switch S+ of the target ship velocity command switch 192 is repeatedly pressed down, the target ship velocity SVT is increased by the unit amount of increase.

At step S306, whether the minus switch S− of the target ship velocity command switch 192 has been pressed down or not is determined. Specifically, the minus switch S− of the target ship velocity command switch 192 is pressed down and turned ON by the operator when the target ship velocity SVT is decreased, and, after the pressing down operation, when the operator stops the pressing down operation, automatically returned to OFF, and thus, whether there has been a change from ON to OFF is determined. If the determination result at step S306 is Yes, the process moves to step S307, and, if the determination result is No, the process moves to step S308. At step S307, a unit amount of decrease, for example, −1 [Km/h] is added to the target ship velocity SVT, and the process subsequently moves to step S308. When the operator decreases the target ship velocity SVT, the minus switch S− of the target ship velocity command switch 192 is repeatedly pressed down. Accordingly, at step S307, at each time when the minus switch S− of the target ship velocity command switch 192 is repeatedly pressed down, the target ship velocity SVT is decreased by the unit amount of decrease.

At step S308, the target ship velocity SVT is limited by the lower limit value and the upper limit value. Specifically, the lower limit value has been set to 10 [Km/h] and the upper limit value has been set to 70 [Km/h], and the target ship velocity SVT is limited between the lower limit value and the upper limit value. In this manner, in the target ship velocity setting unit 100, the target ship velocity SVT is set and the target ship velocity SVT is output from the target ship velocity setting unit 100.

The target ship velocity setting unit 100 continuously outputs the target ship velocity SVT under the condition that the respective engines 21 of the port 20P and the starboard 20S are operated. At step S302, when the ACC latch switch signal ACC-LT is switched to be valid and the constant velocity navigation command ACCI is issued, the target ship velocity SVT is updated. In the updating of the target ship velocity SVT, at step S304, at each time when the plus switch S+ of the target ship velocity command switch 192 is repeatedly pressed down, the target ship velocity SVT is increased by the unit amount of increase, and, at step S306, at each time when the minus switch S− of the target ship velocity command switch 192 is repeatedly pressed down, the target ship velocity SVT is decreased by the unit amount of decrease. If the target ship velocity SVT is not updated, the target ship velocity setting unit 100 outputs the previous value of the target ship velocity SVT.

(4B) Explanation of ACC_Switch Determining Unit 101 of First Computation Means 410

The ACC switch determining unit 101 of the first computation means 410 will be explained with reference to FIGS. 2 and 4. The ACC switch determining unit 101 outputs the ACC latch switch signal ACC-LT. As shown in FIG. 2, the ACC switch determining unit 101 receives the ACC switch signal ACCS from the ACC switch 191 and an ACC control zone ACC-CZN from the execution state determining unit 110, and generates the ACC latch switch signal ACC-LT. The ACC control zone ACC-CZN will be described in detail in section (4G).

Figure 4:
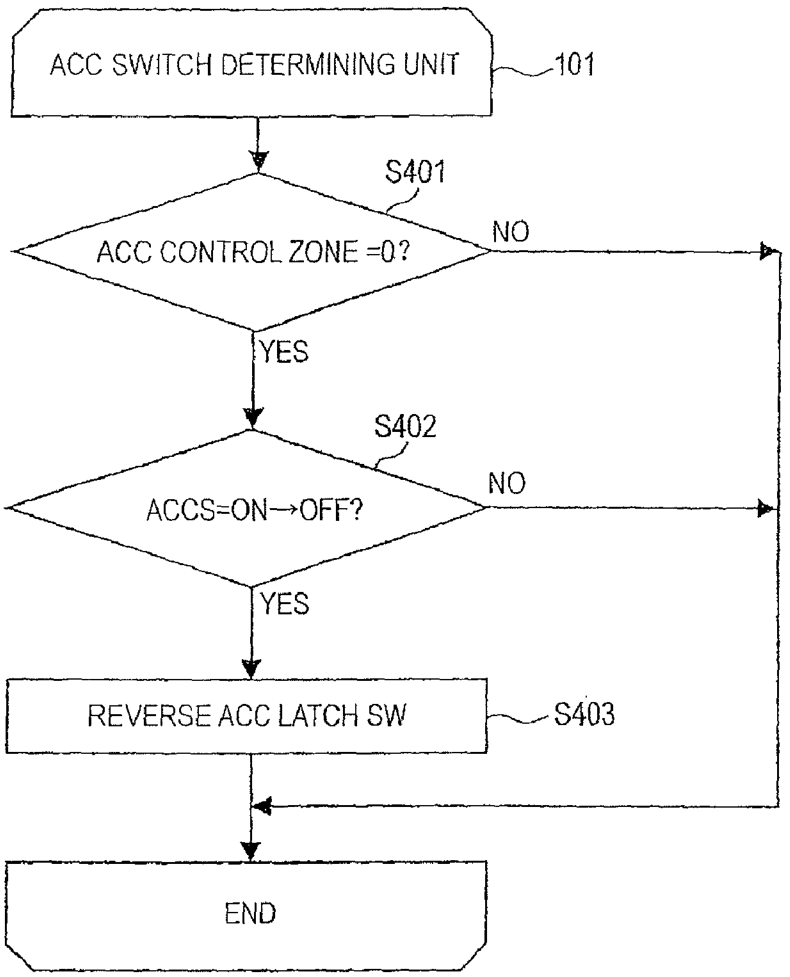
FIG. 4 is a flowchart showing an ACC switch determining unit of the first computation means in the navigation control portion of embodiment 1.

FIG. 4 shows a flowchart of the ACC switch determining unit 101. This flowchart is also repeatedly executed at time intervals of 5 [msec]. The ACC switch determining unit 101 includes steps S401 to S403. Step S402 is executed subsequent to step S401, and step S403 is executed subsequent to step S402. First, at step S401, whether the ACC control zone ACC-CZN from the execution state determining unit 110 is invalid, i.e., at level 0 or not is determined. If the determination result at step S401 is Yes, the process moves to step S402, and, if the determination result at step S401 is No, the process moves to END.

At the next step S402, on the basis of the ACC switch signal ACCS, whether the ACC switch 191 has been pressed down by the operator or not is determined. The ACC switch 191 changes from OFF level to ON level when pressed down by the operator, and automatically returns from ON level to OFF level when the pressing down operation by the operator is stopped. Accordingly, at step S402, whether the ACC switch signal ACCS has changed from ON level to OFF level or not is determined for determination as to whether the ACC switch 191 has been pressed down. If the determination result at step S402 is Yes, the process moves to step S403, and, if the determination result at step S402 is No, the process moves to END.

At step S403, the ACC latch switch is reversed and the ACC latch switch signal ACC-LT is inversed. When the operator first presses down the ACC switch 191 for commanding the constant velocity navigation control ACC, at step S403, the ACC latch switch signal ACC-LT changes from level 0 to level 1 and the constant velocity navigation command ACCI is issued. Under the constant velocity navigation command ACCI has been issued, when the operator presses down the ACC switch 191 again, at step S403, the ACC latch switch signal ACC-LT changes from level 1 to level 0 and the constant velocity navigation command ACCI is canceled.

(4C) Explanation of Target Ne Base Quantity Setting Unit 102 of First Computation Means 410

In the first computation means 410, the target Ne setting unit 104 sets target engine revolution velocities Ne_T for the respective engines 21 of the port 20P and the starboard 20S, and the target engine revolution speed Ne_T is calculated by adding a feedback quantity Ne_FB for the engine revolution speed corresponding to a ship velocity deviation ΔSV to a target engine revolution speed base quantity NeT_OPN. The target Ne base quantity setting unit 102 calculates the target engine revolution speed base quantity NeT_OPN and the ship velocity deviation F/B quantity computing unit 103 computes the feedback quantity Ne_FB for the engine revolution speed corresponding to the ship velocity deviation ΔSV.

The target Ne base quantity setting unit 102 will be explained with reference to FIGS. 2, 5, and 5A. As shown in FIG. 2, the target Ne base quantity setting unit 102 receives the target ship velocity SVT from the target ship velocity setting unit 100, sets the target engine revolution speed base quantity NeT_OPN, and outputs the target engine revolution speed base quantity NeT_OPN. Under the condition that the respective engines 21 of the port 20P and the starboard 20S are operated, the target ship velocity SVT is continuously output from the target ship velocity setting unit 100, and the target Ne base quantity setting unit 102 continuously outputs the target engine revolution speed base quantity NeT_OPN based on the target ship velocity SVT.

Figure 5:
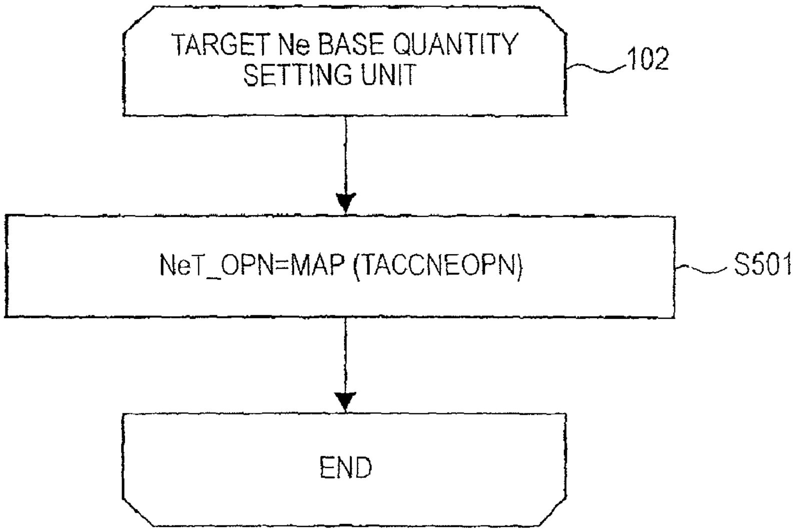
FIG. 5 is a flowchart showing a target Ne base quantity setting unit of the first computation means in the navigation control portion of embodiment 1.

FIG. 5 shows a flowchart of the target Ne base quantity setting unit 102. This flowchart is also repeatedly executed at time intervals of 5 [msec]. The target Ne base quantity setting unit 102 includes step S501. At the step S501, the target engine revolution speed base quantity NeT_OPN is calculated from the target ship velocity SVT using an Ne_OP MAP (TACCNEOPN) stored in advance. FIG. 5A shows an example of the Ne_OP MAP (TACCNEOPN). In the Ne_OP MAP (TACCNEOPN), the vertical axis indicates the target engine revolution speed base quantity NeT_OPN and the horizontal axis indicates the target ship velocity SVT. The target engine revolution speed base quantity NeT_OPN indicated at the vertical axis is a base quantity of the target engine revolution speed for the respective engines 21 of the port 20P and the starboard 20S, and specifically takes a value from 1000 to 7000 [r/min]. The target ship velocity SVT indicated at the horizontal axis specifically takes a value from 0 to 80 [km/h]. The target engine revolution speed base quantity NeT_OPN is output from the target Ne base quantity setting unit 102.

Figure 5A:
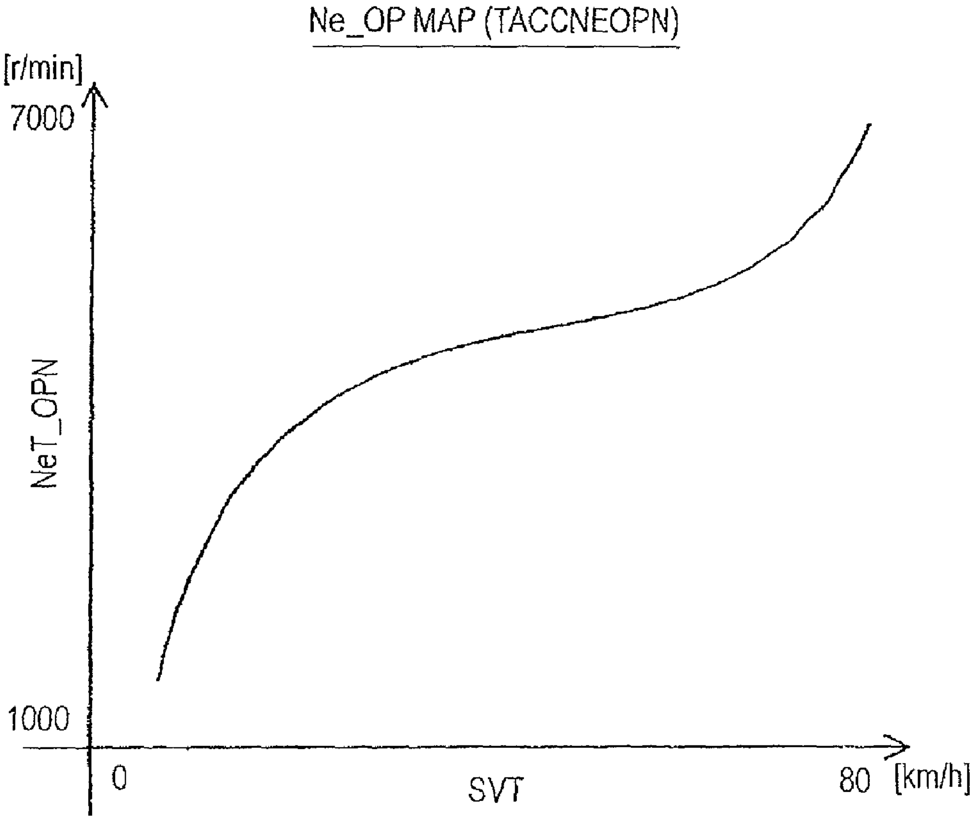
FIG. 5A is a graph showing an Ne_OP MAP (TACCNEOPN) used in the target Ne base quantity setting unit.

When the engines 21 of the port 20P and the starboard 20S are replaced, the Ne_OP MAP (TACCNEOPN) shown in FIG. 5A is replaced by a map corresponding to the replaced new engines 21. Thus, using the Ne_OP MAP (TACCNEOPN) corresponding to the respective engines 21 of the port 20P and the starboard 20S, the target ship velocity SVT can be converted into the target engine revolution speed base quantity NeT_OPN corresponding to the respective engines 21.

(4D) Explanation of Ship Velocity Deviation F/B Quantity Computing Unit 103 of First Computation Means 410

The ship velocity deviation F/B quantity computing unit 103 will be explained with reference to FIGS. 2, 6, 6A, and 6B. The ship velocity deviation F/B quantity computing unit 103 computes and outputs the feedback quantity Ne_FB for the engine revolution speed corresponding to the ship velocity deviation ΔSV. As shown in FIG. 2, the ship velocity deviation F/B quantity computing unit 103 receives the target ship velocity SVT from the target ship velocity setting unit 100, the ship velocity signal SVS from the ship velocity sensor 17, an ACC execution flag ACCF from the execution condition determining unit 111, and calculates the feedback quantity Ne_FB for the engine revolution speed Ne corresponding to the ship velocity deviation ΔSV based thereon. The ACC execution flag ACCF will be described in detail in section (4H).

Figure 6:
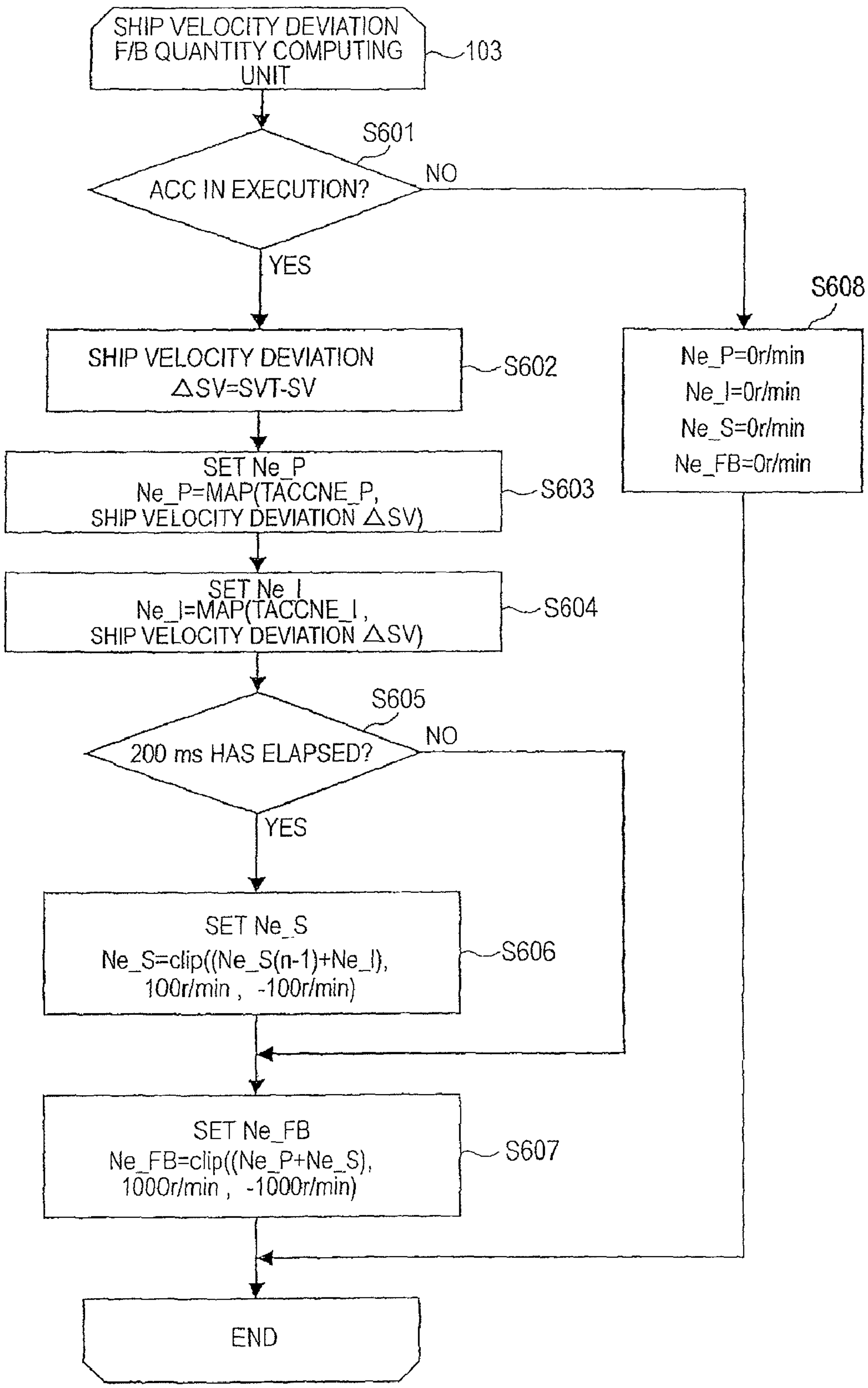
FIG. 6 is a flowchart showing a ship velocity deviation F/B quantity computing unit of the first computation means in the navigation control portion of embodiment 1.
Figure 6A:
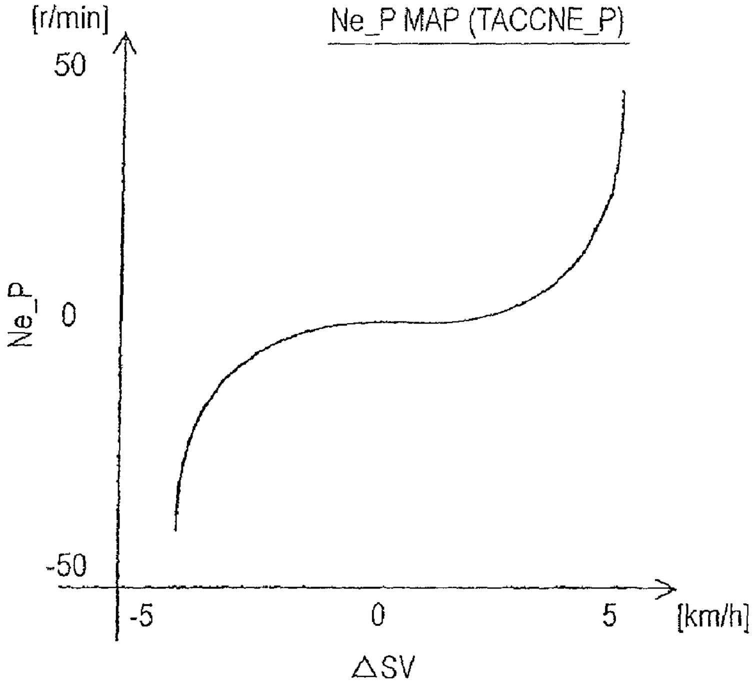
FIG. 6A is a graph showing an Ne_P MAP (TACCNE_P) used in the ship velocity deviation F/B quantity computing unit.
Figure 6B:
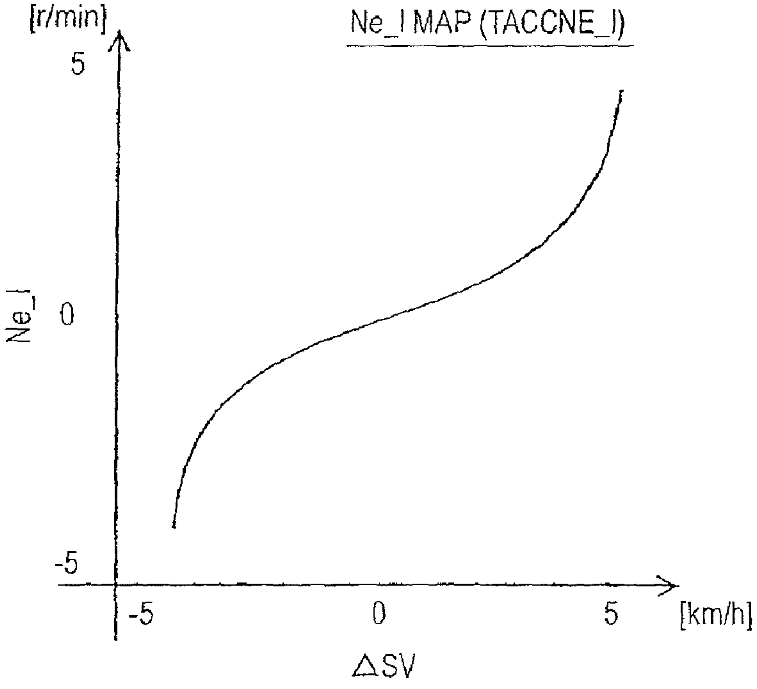
FIG. 6B is a graph showing an Ne_I MAP (TACCNE_I) used in the ship velocity deviation F/B quantity computing unit.

FIG. 6 shows a flowchart of the ship velocity deviation F/B quantity computing unit 103. This flowchart is also repeatedly executed at time intervals of 5 [msec]. The ship velocity deviation F/B quantity computing unit 103 includes steps S601 to S608. In the ship velocity deviation F/B quantity computing unit 103, a proportional control component Ne_P for the engine revolution speed Ne corresponding to the ship velocity deviation ΔSV, an integral control parameter Ne_I for the engine revolution speed Ne corresponding to the ship velocity deviation ΔSV, an integral control component Ne_S for the engine revolution speed Ne corresponding to the ship velocity deviation ΔSV, and the feedback quantity Ne_FB for the engine revolution speed Ne corresponding to the ship velocity deviation ΔSV are calculated. The proportional control component Ne_P for the engine revolution speed Ne corresponding to the ship velocity deviation ΔSV is calculated and set at step S603. The integral control parameter Ne_I for the engine revolution speed Ne corresponding to the ship velocity deviation ΔSV is calculated and set at step S604. The integral control component Ne_S for the engine revolution speed Ne corresponding to the ship velocity deviation ΔSV is calculated and set at step S606. The feedback quantity Ne_FB for the engine revolution speed Ne corresponding to the ship velocity deviation ΔSV is calculated and set at step S607. The feedback quantity Ne_FB for the engine revolution speed Ne set at step S607 is output from the ship velocity deviation F/B quantity computing unit 103.

In FIG. 6, first, at step S601, whether the ACC execution flag ACCF from the execution condition determining unit 111 is at level 1 or not, i.e., the constant velocity navigation control ACC is in execution or not is determined. If the determination result at step S601 is Yes, the process moves to step S602, and, if the result is No, the process moves to step S608. At step S608, all of the proportional control component Ne_P for the engine revolution speed Ne corresponding to the ship velocity deviation ΔSV, the integral control parameter Ne_I for the engine revolution speed corresponding to the ship velocity deviation ΔSV, the integral control component Ne_S for the engine revolution speed corresponding to the ship velocity deviation ΔSV, and the feedback value Ne_FB for the engine revolution speed corresponding to the ship velocity deviation ΔSV are set to zero. When the constant velocity navigation control ACC is in execution, steps S602 to S607 are executed.

At step S602, the ship velocity deviation ΔSV is computed according to the following equation (1) from the target ship velocity SVT and the current ship velocity SV.

$$\Delta SV=SVT-SV \tag{1}$$

Note that the ship velocity SV is a current ship velocity represented by the ship velocity signal SVS.

The process moves from step S602 to step S603. At the step S603, using an Ne_P MAP (TACCNE_P) shown in FIG. 6A, from the ship velocity deviation ΔSV, the corresponding proportional control component Ne_P for the engine revolution speed Ne is obtained. The vertical axis of FIG. 6A indicates the proportional control component Ne_P for the engine revolution speed Ne, and the horizontal axis indicates the ship velocity deviation ΔSV. The proportional control component Ne_P at the vertical axis specifically takes a value from −50 to +50 [r/min], and the ship velocity deviation ΔSV at the horizontal axis specifically takes a value from −5 to +5 [km/h].

The process moves from step S603 to step S604. At the step S604, using an Ne_I MAP (TACCNE_I) shown in FIG. 6B, from the ship velocity deviation ΔSV, the corresponding integral control parameter Ne_I for the engine revolution speed Ne is obtained. The vertical axis of FIG. 6B indicates the integral control parameter Ne_I for the engine revolution speed Ne, and the horizontal axis indicates the ship velocity deviation ΔSV. The integral control parameter Ne_I at the vertical axis specifically takes a value from −5 to +5 [r/min], and the ship velocity deviation ΔSV at the horizontal axis specifically takes a value from −5 to +5 [km/h].

The process moves from step S604 to step S605. At the step S605, whether a predetermined update time interval t, specifically, 200 [msec] has elapsed or not is determined. The integral control component Ne_S corresponding to the ship velocity deviation ΔSV performs processing of sequentially adding the integral control parameter Ne_I obtained at step S604 to the previous value at each time when the update time interval t elapses. At step S605, whether the predetermined update time interval t has elapsed or not is determined. If the determination result at step S605 is Yes, the process moves to step S606, and, if the determination result is No, the process bypasses step S606 and moves to step S607.

At step S606, the integral control component Ne_S for the engine revolution speed Ne is computed. At the step S606, according to the following equation (2), the integral control component Ne_S for the engine revolution speed Ne is updated by adding the integral control parameter Ne_I for the engine revolution speed Ne obtained at step S604 to the previous integral control component Ne_S (n−1) for the engine revolution speed Ne, and then, the integral control component Ne_S for the engine revolution speed Ne is limited between the upper limit value of +100 [r/min] and the lower limit value of −100 [r/min].

$$Ne\_S=Ne\_S(n-1)+Ne\_I \tag{2}$$

The process moves from step S605 or step S606 to step S607. At step S607, the feedback value Ne_FB for the engine revolution speed Ne corresponding to the ship velocity deviation ΔSV is set. At the step S607, according to the following equation (3), the feedback value Ne_FB for the engine revolution speed Ne corresponding to the ship velocity deviation ΔSV is obtained by adding the integral control component Ne_S for the engine revolution speed Ne obtained at step S606 to the proportional control component Ne_P for the engine revolution speed Ne obtained at step S603, and then, the feedback value Ne_FB for the engine revolution speed Ne is limited between the upper limit value of +1000 [r/min] and the lower limit value of −1000 [r/min].

$$Ne\_FB=Ne\_P+Ne\_S \tag{3}$$

The ship velocity deviation F/B quantity computing unit 103 executes steps S602 to S607 when the ACC execution flag ACCF is at level 1, i.e., the constant velocity navigation control ACC is executed, and outputs the feedback value Ne_FB for the engine revolution speed Ne obtained at step S607. When the ACC execution flag ACCF is at level 0, at step S608, the feedback value Ne_FB for the engine revolution speed Ne is set to zero.

(4E) Explanation of Target Ne Setting Unit 104 of First Computation Means 410

The target Ne setting unit 104 will be explained with reference to FIGS. 2 and 7. As shown in FIG. 2, the target Ne setting unit 104 receives the target engine revolution speed base quantity NeT_OPN from the target Ne base quantity setting unit 102, the feedback value Ne_FB for the engine revolution speed Ne corresponding to the ship velocity deviation ΔSV from the ship velocity deviation F/B quantity computing unit 103, computes the target engine revolution speed Ne_T, and outputs it. Under the condition that the respective engines 21 of the port 20P and the starboard 20S are operated, the target engine revolution speed base quantity NeT_OPN from the target Ne base quantity setting unit 102 is continuously output, and, even when the feedback value Ne_FB for the engine revolution speed Ne corresponding to the ship velocity deviation ΔSV from the ship velocity deviation F/B quantity computing unit 103 becomes zero, for example, the target Ne setting unit 104 computes the target engine revolution speed Ne_T and outputs it.

Figure 7:
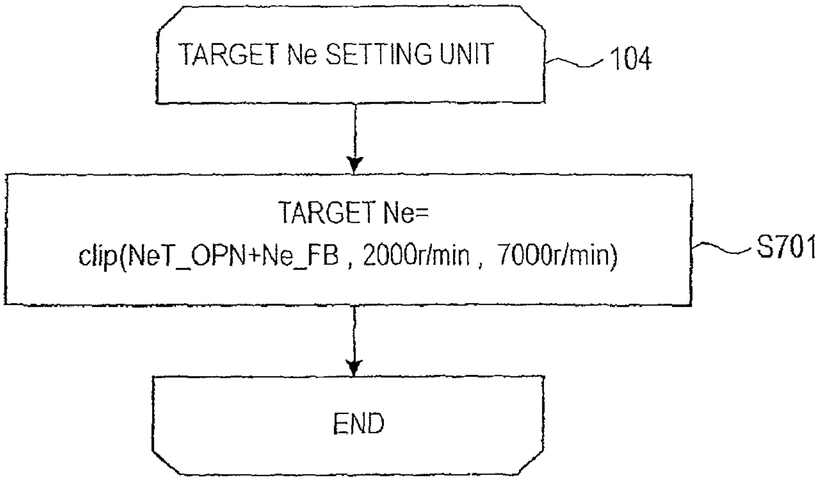
FIG. 7 is a flowchart showing a target Ne setting unit of the first computation means in the navigation control portion of embodiment 1.

FIG. 7 shows a flowchart of the target Ne setting unit 104. This flowchart is also repeatedly executed at time intervals of 5 [msec]. The target Ne setting unit 104 includes step S701. At the step S701, according to the following equation (4), the target engine revolution speed Ne_T is computed by adding the target engine revolution speed base quantity NeT_OPN and the feedback value Ne_FB for the engine revolution speed Ne, and then, the target engine revolution speed Ne_T is limited between the lower limit value of 2000 [r/min] and the upper limit value of 7000 [r/min].

$$Ne\_T=NeT\_OPN+Ne\_FB \quad (4)$$

(4F) Explanation of Target APS (ACC) Base Quantity Setting Unit 105 of First Computation Means 410

The target APS (ACC) base quantity setting unit 105 will be explained with reference to FIGS. 2, 8, and 8A. As shown in FIG. 2, the target APS (ACC) base quantity setting unit 105 receives the target engine revolution speed Ne_T from the target Ne setting unit 104, and outputs a target APS (ACC) base quantity APSC_OPN. The target APS (ACC) base quantity APSC_OPN is a base quantity of the throttle opening of each engine 21 of the port 20P and the starboard 20S in the constant velocity navigation control ACC. Under the condition that the respective engines 21 of the port 20P and the starboard 20S are operated, the target engine revolution speed Ne_T from the target Ne setting unit 104 is continuously output, and the target APS (ACC) base quantity setting unit 105 also continuously outputs the target APS (ACC) base quantity APSC_OPN.

Figure 8:
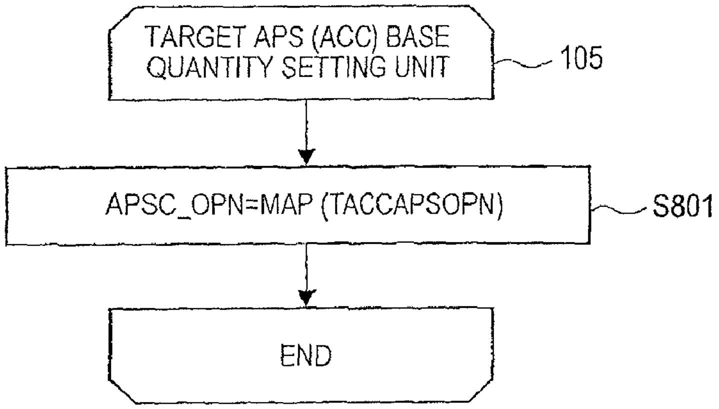
FIG. 8 is a flowchart showing a target APS (ACC) base quantity setting unit of the first computation means in the navigation control portion of embodiment 1.
Figure 8A:
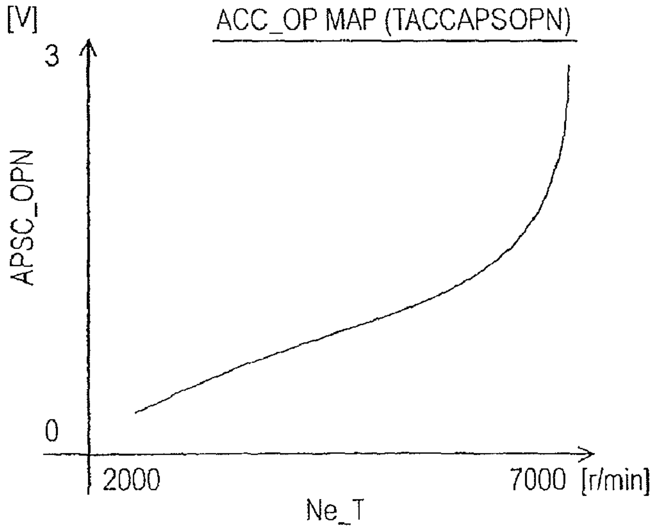
FIG. 8A is a graph showing an ACC_OP MAP (TACCAPSOPN) used in the target APS (ACC) base quantity setting unit.

FIG. 8 shows a flowchart of the target APS (ACC) base quantity setting unit 105. This flowchart is also repeatedly executed at time intervals of 5 [msec]. The target APS (ACC) base quantity setting unit 105 includes step S801. At the step S801, using an ACC_OP MAP (TACCAPSOPN) shown in FIG. 8A, the target APS (ACC) base quantity APSC_OPN corresponding to the target engine revolution speed Ne_T is output. The vertical axis of FIG. 8A indicates the target APS (ACC) base quantity APSC_OPN, and the horizontal axis indicates the target engine revolution speed Ne_T. The target APS (ACC) base quantity APSC_OPN at the vertical axis specifically takes a value from 0 to 3 [V], and the target engine revolution speed Ne_T at the horizontal axis specifically takes a value from 2000 to 7000 [r/min].

(4G) Explanation of Execution State Determining Unit 110 of First Computation Means 410

The execution state determining unit 110 will be explained with reference to FIGS. 2 and 9. The execution state determining unit 110 determines whether the constant velocity navigation control ACC is feasible or not. As shown in FIG. 2, the execution state determining unit 110 receives the target engine revolution speed base quantity NeT_OPN from the target Ne base quantity setting unit 102, the target APS (ACC) base quantity APSC_OPN from the APS (ACC) base quantity setting unit 105, the second target throttle opening APSL (Port) from the target APS (Lever) calculating unit (Port) 202, the second target throttle opening APSL (Stbd) from the target APS (Lever) calculating unit (Stbd) 302, and the real engine revolution velocities Ne (port), Ne (Stbd) from the respective engine control modules 24 of the port 20P and the starboard 20S, and outputs the ACC control zone ACC-CZN. The ACC control zone ACC-CZN represents whether the constant velocity navigation control ACC is feasible or not.

Figure 9:
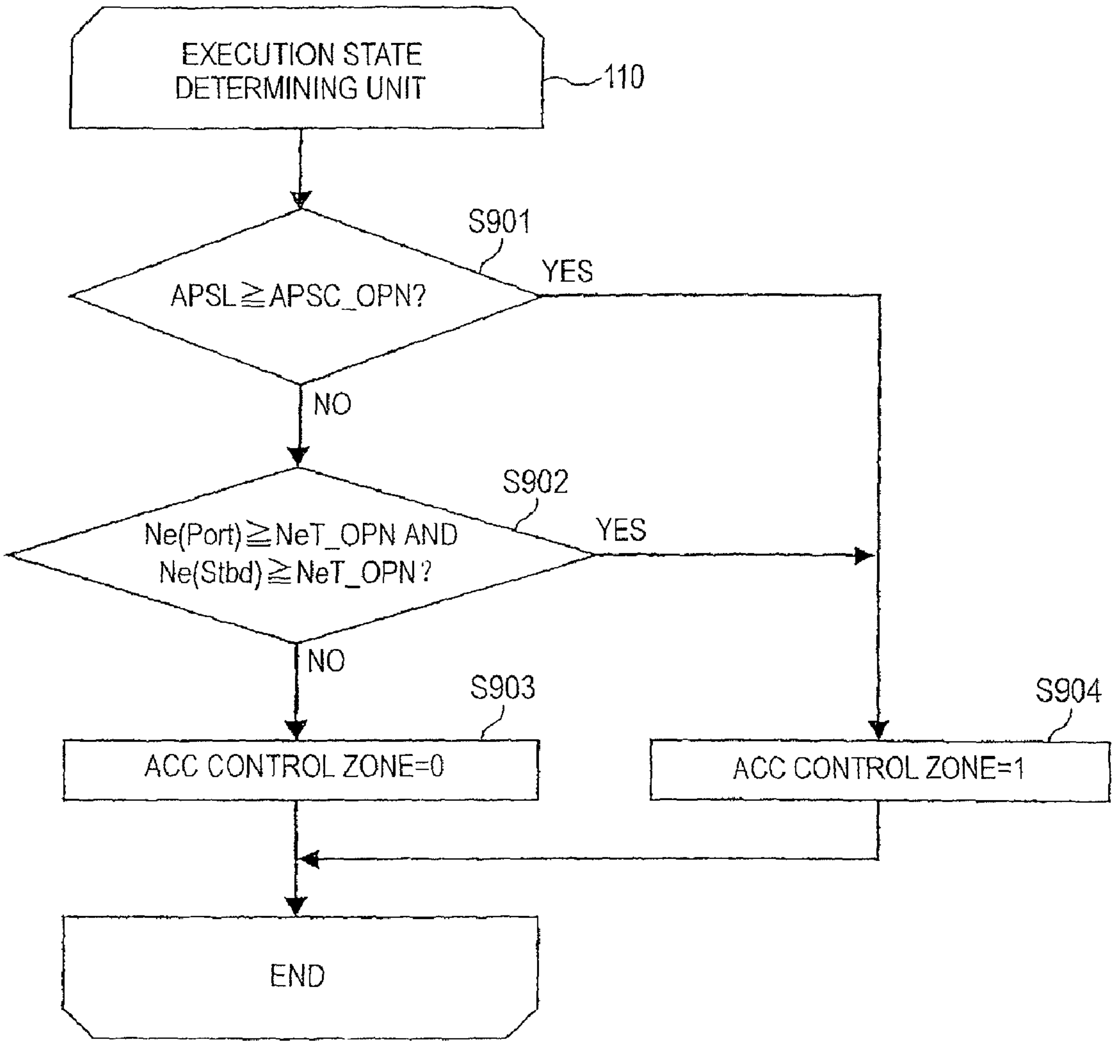
FIG. 9 is a flowchart showing an execution state determining unit of the first computation means in the navigation control portion of embodiment 1.

FIG. 9 shows a flowchart of the execution state determining unit 110. This flowchart is also repeatedly executed at time intervals of 5 [msec]. The execution state determining unit 110 includes steps 901 to 904. At step S901, whether the second target throttle openings APSL (Port), APSL (Stbd) are equal to or more than the target APS (ACC) base quantity APSC_OPN or not is determined. If the determination result at step S901 is Yes, the process moves to step S904, and, if the determination result is No, the process moves to step S902. At step S902, whether the real engine revolution speed Ne (port) is equal to or more than the target engine revolution speed base quantity NeT_OPN and the real engine revolution speed Ne (Stbd) is equal to or more than the target engine revolution speed base quantity NeT_OPN or not is determined. If the determination result at step S902 is Yes, the process moves to step S904, and, if the determination result is No, the process moves to step S903.

At step S903, the ACC control zone ACC-CZN is set to level 0. The state that the ACC control zone ACC-CZN is set to level 0 means that the constant velocity navigation control ACC is not feasible. At step S904, the ACC control zone ACC-CZN is set to level 1. The state that the ACC control zone ACC-CZN is set to level 1 means that the constant velocity navigation control ACC is feasible.

At step S901, if the second target throttle openings APSL (Port), APSL (Stbd) are less than the target APS (ACC) base quantity APSC_OPN, the process moves to step S902. Further, at step S902, the real engine revolution speed Ne (port) is less than the target engine revolution speed base quantity NeT_OPN and the real engine revolution speed Ne (Stbd) is less than the target engine revolution speed base quantity NeT_OPN, at step S903, the ACC control zone ACC-CZN is set to level 0. The condition for making both of the determination results at step S901 and step S902 are No means that the constant velocity navigation control ACC is not feasible. In other words, the condition is not suitable for execution of the constant velocity navigation control ACC or the execution of the constant velocity navigation control ACC is meaningless.

(4H) Explanation of Execution Condition Determining Unit 111 of First Computation Means 410

The execution condition determining unit 111 will be explained with reference to FIGS. 2 and 10. The execution condition determining unit 111 determines whether the constant velocity navigation control ACC is feasible or not and whether the constant velocity navigation command ACCI has been issued or not, and outputs the ACC execution flag ACCF based on the determination. The execution condition determining unit 111 receives the ACC control zone ACC-CZN from the execution state determining unit 110 and the ACC latch switch signal ACC-LT from the ACC switch determining unit 101, and controls the ACC execution flag ACCF at level 0 or level 1. The control that the ACC execution flag ACCF is at level 1 means that the condition for execution of the constant velocity navigation control ACC is satisfied, and the constant velocity navigation control ACC is permitted and executed. Further, the control that the ACC execution flag ACCF is at level 0 means that the condition for execution of the constant velocity navigation control ACC is unsatisfied, and the constant velocity navigation control ACC is canceled.

Figure 10:
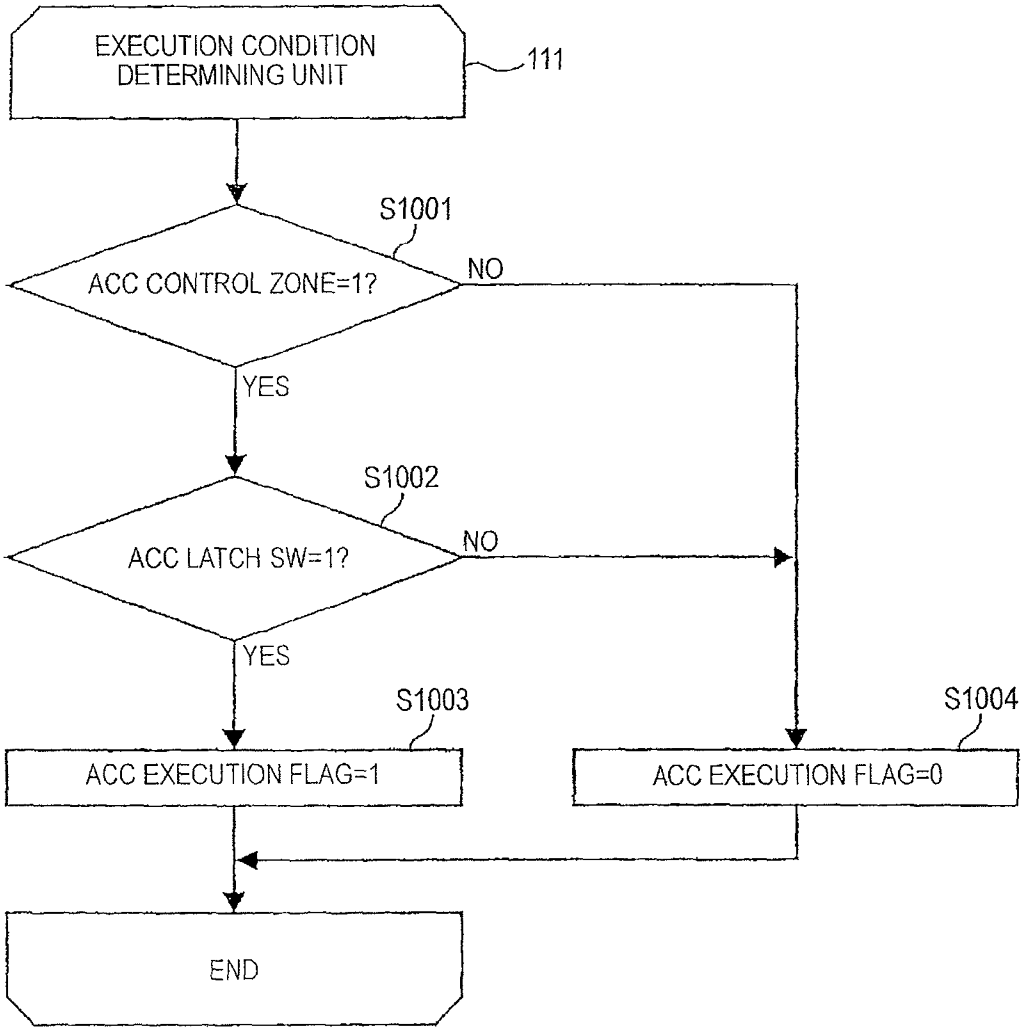
FIG. 10 is a flowchart showing an execution condition determining unit of the first computation means in the navigation control portion of embodiment 1.

FIG. 10 shows a flowchart of the execution condition determining unit 111. This flowchart is also repeatedly executed at time intervals of 5 [msec]. The execution condition determining unit 111 includes steps S1001 to S1004. At step S1001, whether the ACC control zone ACC-CZN is at level 1 or not, i.e., whether the constant velocity navigation control ACC is feasible or not is determined. If the determination result at step S1001 is Yes, the process moves to step S1002, and, if the determination result is No, the process moves to step S1004. At step S1002, whether the ACC latch switch signal ACC-LT is at level 1 or not is determined, in other words, whether the constant velocity navigation command ACCI has been issued or not is determined. If the determination result at step S1002 is Yes, the process moves to step S1003, and, if the determination result is No, the process moves to step S1004. At step S1003, for permission of the execution of the constant velocity navigation control ACC, the ACC execution flag ACCF is set at level 1. At step S1004, for cancelling the execution of the constant velocity navigation control ACC, the ACC execution flag ACCF is set at level 0.

The ACC execution flag ACCF is at level 1 when both the determination results at step S1001 and S1002 are Yes. That is, the ACC execution flag ACCF is at level 1 when the ACC control zone ACC-CZN is at level 1 and the ACC latch switch signal ACC-LT is at level 1. The ACC latch switch signal ACC-LT is at level 1 when the constant velocity navigation command ACCI is issued by the operation of the ACC switch 191, and this continues until the ACC switch 191 is operated again and the constant velocity navigation command ACCI is cancelled. If the ACC control zone ACC-CZN is at level 0, the ACC execution flag ACCF is at level 0. If the ACC latch switch signal ACC-LT is at level 0, the ACC execution flag ACCF is at level 0.

(4I) Explanation of Ne Deviation F/B Quantity Computing Unit (Port) 203 and Ne Deviation F/B Quantity Computing Unit (Stbd) 303 of First Computation Means 410

The Ne deviation F/B quantity computing unit (Port) 203 and the Ne deviation F/B quantity computing unit (Stbd) 303 of the first computation means 410 will be explained with reference to FIGS. 2, 11, 11A, and 11B. The Ne deviation F/B quantity computing unit (Port) 203 computes an ACC feedback quantity ACC_FB (port) for the constant velocity navigation control ACC corresponding to a revolution speed deviation ΔNe of the engine revolution speed of the port 20P. The Ne deviation F/B quantity computing unit (Stbd) 303 computes an ACC feedback quantity ACC_FB (Stbd) for the constant velocity navigation control ACC corresponding to a revolution speed deviation ΔNe of the engine revolution speed of the starboard 20S. These ACC feedback quantity ACC_FB (port) and ACC feedback quantity ACC_FB (Stbd) are feedback quantities for the throttle openings of the respective engines 21 of the port 20P and the starboard 20S corresponding to the revolution deviations ΔNe, and computed when the ACC execution flag ACCF from the execution condition determining unit 111 is at level 1.

As shown in FIG. 2, the Ne deviation F/B quantity computing unit (Port) 203 receives the ACC execution flag ACCF from the execution condition determining unit 111, the target engine revolution speed Ne_T from the target Ne setting unit 104, and the real engine revolution speed Ne (port) from the engine control module 24 of the port 20P, and outputs the ACC feedback quantity ACC_FB (port) for the constant velocity navigation control ACC for the port 20P. The Ne deviation F/B quantity computing unit (Stbd) 303 receives the ACC execution flag ACCF from the execution condition determining unit 111, the target engine revolution speed Ne_T from the target Ne setting unit 104, and the real engine revolution speed Ne (Stbd) from the engine control module 24 of the starboard 20S, and outputs the ACC feedback quantity ACC_FB (Stbd) for the constant velocity navigation control ACC for the starboard 20S.

Figure 11:
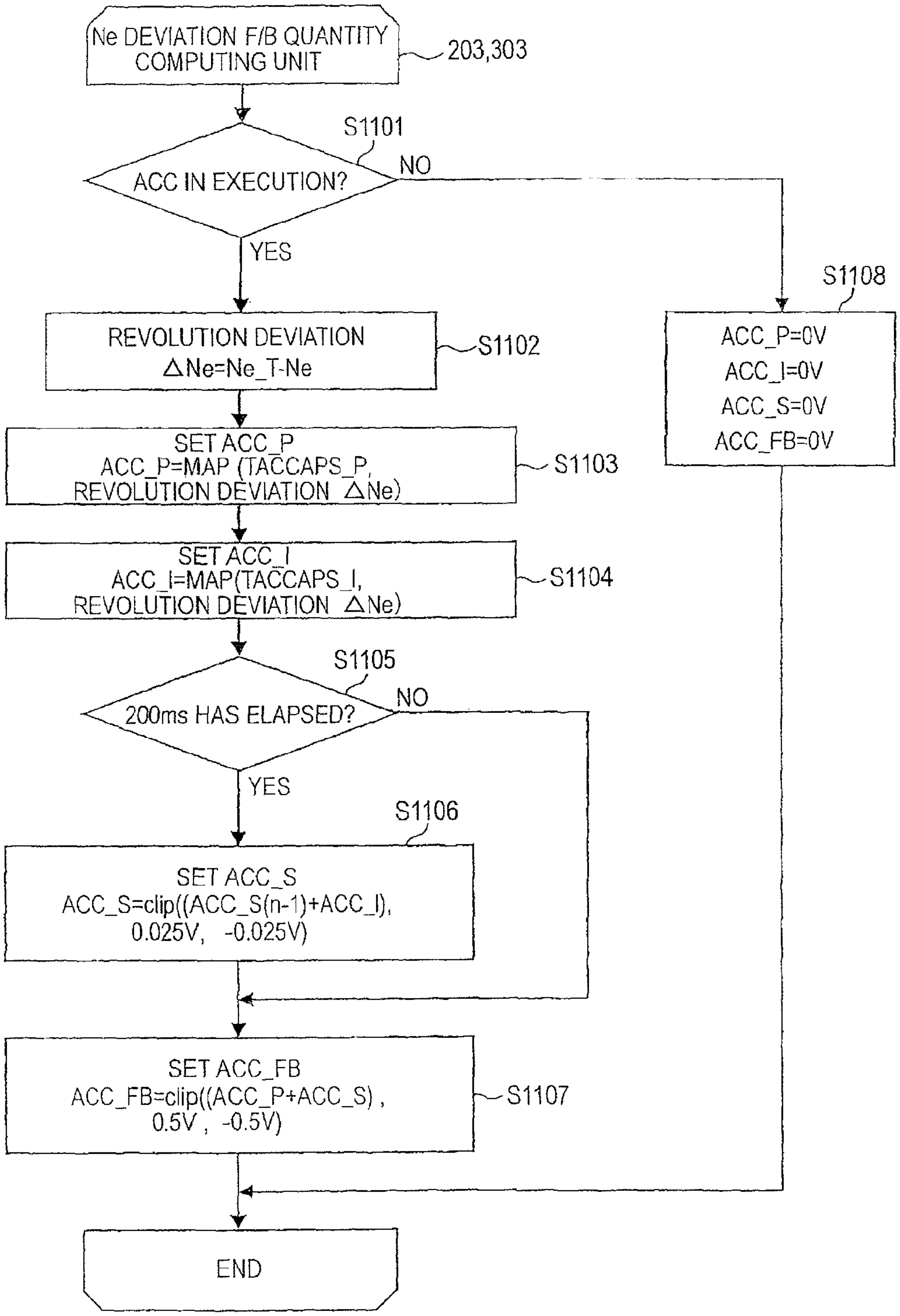
FIG. 11 is a flowchart showing an Ne deviation F/B quantity computing unit of the first computation means in the navigation control portion of embodiment 1.
Figure 11A:
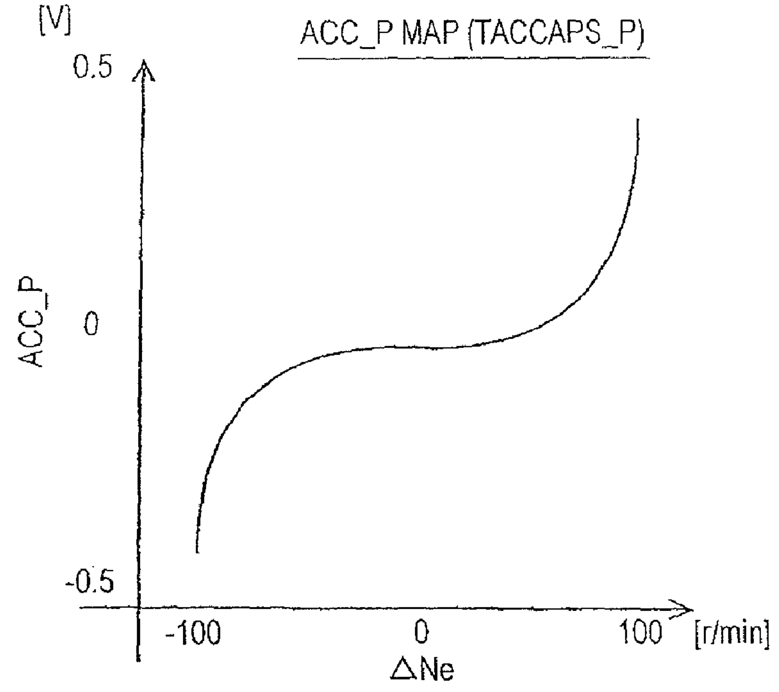
FIG. 11A is a graph showing an ACC_P MAP (TACCAPS_P) used in the Ne deviation F/B quantity computing unit.
Figure 11B:
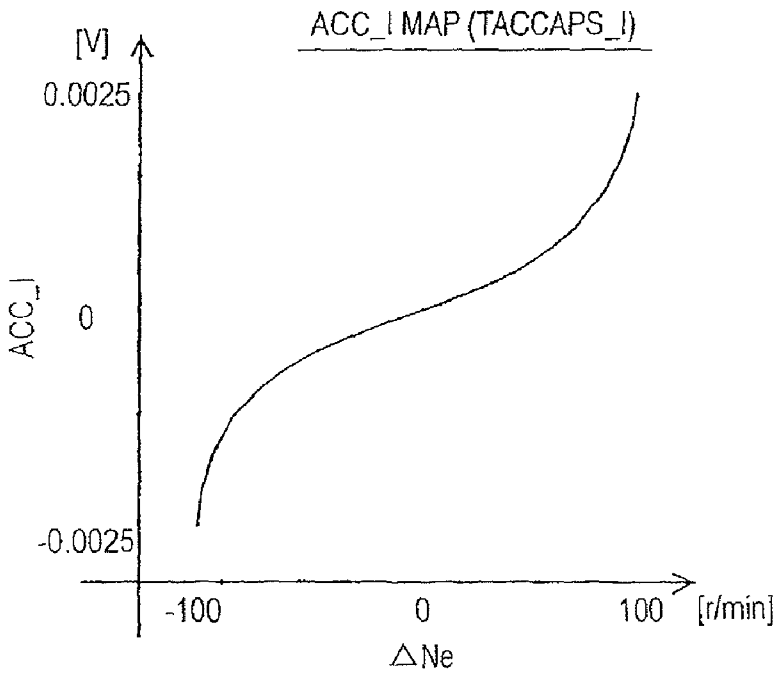
FIG. 11B is a graph showing an ACC_I MAP (TACCAPS_I) used in the Ne deviation F/B quantity computing unit.

The Ne deviation F/B quantity computing unit (Port) 203 and the Ne deviation F/B quantity computing unit (Stbd) 303 operate according to the same flowchart. FIG. 11 shows a flowchart of the Ne deviation F/B quantity computing unit (Port) 203 and the Ne deviation F/B quantity computing unit (Stbd) 303. This flowchart is also repeatedly executed at time intervals of 5 [msec]. The flowchart includes steps S1101 to S1108. In the flowchart, a proportional control component ACC_P for the ACC feedback quantity corresponding to the engine revolution speed deviation ΔNe, an integral control parameter ACC_I for the ACC feedback quantity corresponding to the engine revolution speed deviation ΔNe, an integral control component ACC_S for the ACC feedback quantity corresponding to the engine revolution speed deviation ΔNe, and the ACC feedback quantity ACC_FB corresponding to the engine revolution speed deviation ΔNe are calculated. The proportional control component ACC_P for the ACC feedback quantity corresponding to the engine revolution speed deviation ΔNe is calculated and set at step S1103. The integral control parameter ACC_I for the ACC feedback quantity corresponding to the engine revolution speed deviation ΔNe is calculated and set at step S1104. The integral control component ACC_S for the ACC feedback quantity corresponding to the engine revolution speed deviation ΔNe is calculated and set at step S1106. The ACC feedback quantity ACC_FB corresponding to the engine revolution speed deviation ΔNe is calculated and set at step S1107. The ACC feedback quantities ACC_FB set at step S1107 are output as the ACC feedback quantity ACC_FB (port) and the ACC feedback quantity ACC_FB (Stbd) from the Ne deviation F/B quantity computing unit (Port) 203 and the Ne deviation F/B quantity computing unit (Stbd) 303, respectively.

In FIG. 11, at step S1101, whether the ACC execution flag ACCF from the execution condition determining unit 111 is at level 1 or not, i.e., whether the constant velocity navigation control ACC is in execution or not is determined. If the determination result at step S1101 is Yes, the process moves to step S1102, and, if the result is No, the process moves to step S1108. At step S1108, all of the proportional control component ACC_P for the ACC feedback quantity, the integral control parameter ACC_I for the ACC feedback quantity, the integral control component ACC_S for the ACC feedback quantity, and the ACC feedback quantity ACC_FB for the constant velocity navigation control ACC are set to zero.

At step S1102, the engine revolution speed deviation ΔNe is computed according to the following equation (5) from the target engine revolution speed Ne_T and the real engine revolution speed Ne from the target Ne setting unit 104. The real engine revolution speed Ne is the real engine revolution speed Ne (port) or Ne (Stbd) and supplied from the engine control module 24 of the port 20P or the starboard 20S.

$$\Delta Ne = Ne\_T - Ne \qquad (5)$$

The process moves from step S1102 to step S1103. At the step S1103, using an ACC_P MAP (TACCAPS_P) shown in FIG. 11A, from the engine revolution speed deviation ΔNe, the corresponding proportional control component ACC_P for the ACC feedback quantity is obtained. The vertical axis of FIG. 11A indicates the proportional control component ACC_P for the ACC feedback quantity, and the horizontal axis indicates the engine revolution speed deviation ΔNe. The proportional control component ACC_P at the vertical axis specifically takes a value from −0.5 to +0.5 [V], and the engine revolution speed deviation ΔNe at the horizontal axis specifically takes a value from −100 to +100 [r/min].

The process moves from step S1103 to S1104. At the step S1104, using an ACC_I MAP (TACCAPS_I) shown in FIG. 11B, from the engine revolution speed deviation ΔNe, the corresponding integral control parameter ACC_I for the ACC feedback quantity is obtained. The vertical axis of FIG. 11B indicates the integral control parameter ACC_I for the ACC feedback quantity, and the horizontal axis indicates the engine revolution speed deviation ΔNe. The integral control parameter ACC_I at the vertical axis specifically takes a value from −0.0025 to +0.0025 [V], and the engine revolution speed deviation ΔNe at the horizontal axis specifically takes a value from −100 to +100 [r/min].

The process moves from step S1104 to S1105. At the step S1105, whether a predetermined update time interval t, specifically, 200 [msec] has elapsed or not is determined. The proportional control component ACC_S for the ACC feedback quantity corresponding to the engine revolution speed deviation ΔNe is computed by sequentially adding the integral control parameter ACC_I obtained at step S1104 to the previous value at each time when the update time interval t elapses. At step S1105, whether the predetermined update time interval t has elapsed or not is determined. If the determination result at step S1105 is Yes, the process moves to step S1106, and, if the determination result is No, the process bypasses step S1106 and moves to step S1107.

At step S1106, the integral control component ACC_S for the ACC feedback quantity is set. At the step S1106, according to the following equation (6), the integral control component ACC_S for the ACC feedback quantity is obtained by adding the integral control parameter ACC_I obtained at step S1104 to the previous values of the integral control component ACC_S(n−1) for the ACC feedback quantity, and then, the integral control component ACC_S is limited between the upper limit value of +0.025 [V] and the lower limit value of −0.025 [V].

$$ACC\_S = ACC\_S(n-1) + ACC\_I \quad (6)$$

The process moves from step S1105 or step S1106 to step S1107. At step S1107, the ACC feedback quantity ACC_FB is set. At the step S1107, according to the following equation (7), the ACC feedback quantity ACC_FB is obtained by adding the proportional control component ACC_P for the ACC feedback quantity obtained at step S1103 to the integral control component ACC_S for the ACC feedback quantity obtained at step S1106, and then, the ACC feedback quantity ACC_FB is limited between the upper limit value of +0.5 [V] and the lower limit value of −0.5 [V].

$$ACC\_FB = ACC\_P + ACC\_S \quad (7)$$

The Ne deviation F/B quantity computing unit (Port) 203 outputs the ACC feedback quantity ACC_FB obtained at step S1107 as the throttle feedback quantity ACC_FB (Port) for the port 20P. The Ne deviation F/B quantity computing unit (Stbd) 303 outputs the ACC feedback quantity ACC_FB obtained at step S1107 as the ACC feedback quantity ACC_FB (Stbd) for the starboard 20S.

Both the Ne deviation F/B quantity computing unit (Port) 203 and the Ne deviation F/B quantity computing unit (Stbd) 303 execute steps S1102 to S1107 when the ACC execution flag ACCF is at level 1, i.e., the constant velocity navigation control ACC is executed, and output the ACC feedback quantities ACC_FB obtained at step S1107. When the ACC execution flag ACCF is at level 0, at step S1108, the ACC feedback quantity ACC_FB is set to zero.

(4J) Explanation of Target APS (ACC) Setting Unit (Port) 204 and Target APS (ACC) Setting Unit (Stbd) 304 of First Computation Means 410

Figure 12:
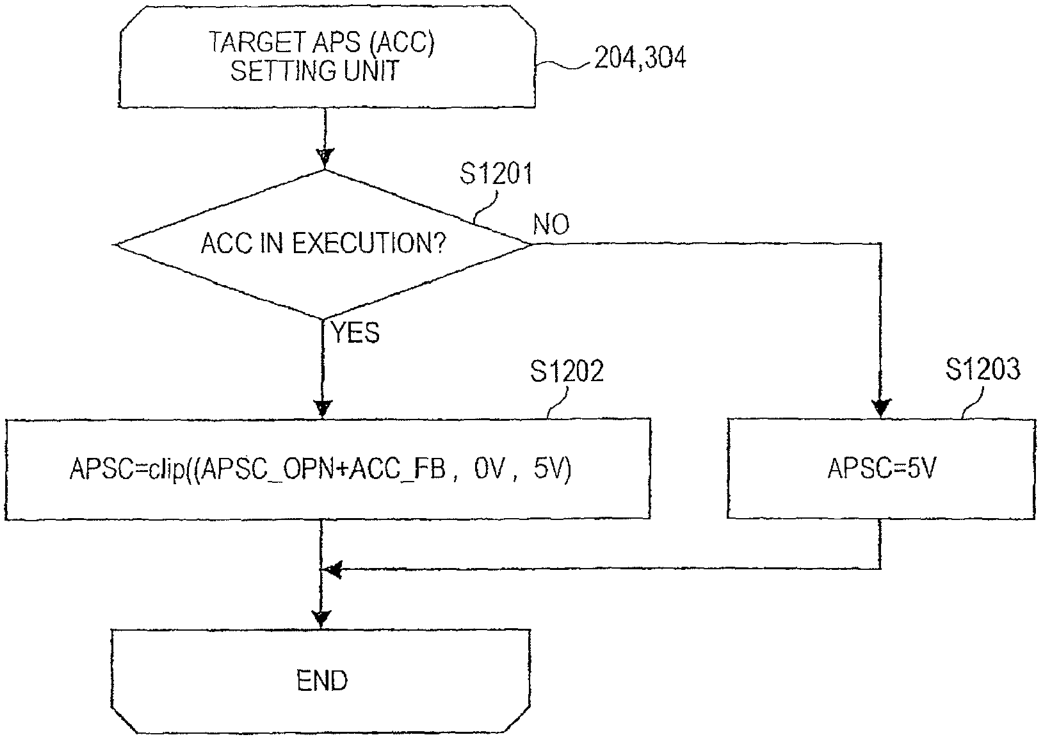
FIG. 12 is a flowchart showing a target APS (ACC) setting unit of the first computation means in the navigation control portion of embodiment 1.

The target APS (ACC) setting unit (Port) 204 and the target APS (ACC) setting unit (Stbd) 304 of the first computation means 410 will be explained with reference to FIGS. 2 and 12. The target APS (ACC) setting unit (Port) 204 sets a first target throttle opening APSC (Port) for the constant velocity navigation control ACC for the port 20P and outputs it. The target APS (ACC) setting unit (Stbd) 304 sets a first target throttle opening APSC (Stbd) for constant velocity navigation control ACC for the starboard 20S and outputs it. The first target throttle opening APSC (Port) and the first target throttle opening APSC (Stbd) are target throttle openings of the respective engines 21 of the port 20P and the starboard 20S for the constant velocity navigation control ACC, and computed when the ACC execution flag ACCF from the execution condition determining unit 111 is at level 1.

As shown in FIG. 2, the target APS (ACC) setting unit (Port) 204 receives the ACC execution flag ACCF from the execution condition determining unit 111, the target APS (ACC) base quantity APSC_OPN from the APS (ACC) base quantity setting unit 105, and the ACC feedback quantity ACC_FB (port) from the Ne deviation F/B quantity computing unit (Port) 203, and outputs the first target throttle opening APSC (Port) for the constant velocity navigation control ACC for the port 20P. As shown in FIG. 2, the target APS (ACC) setting unit (Stbd) 304 receives the ACC execution flag ACCF from the execution condition determining unit 111, the target APS (ACC) base quantity APSC_OPN from the APS (ACC) base quantity setting unit 105, and the ACC feedback quantity ACC_FB (Stbd) from the Ne deviation F/B quantity computing unit (Stbd) 303, and outputs the first target throttle opening APSC (Stbd) for the constant velocity navigation control ACC for the starboard 20S.

The target APS (ACC) setting unit (Port) 204 and the target APS (ACC) setting unit (Stbd) 304 operate according to the same flowchart. FIG. 12 shows a flowchart of the target APS (ACC) setting unit (Port) 204 and the target APS (ACC) setting unit (Stbd) 304. This flowchart is also repeatedly executed at time intervals of 5 [msec]. The flowchart includes steps S1201 to S1203. First, at step S1201, whether the ACC execution flag ACCF is at level 1 or not, i.e., the constant velocity navigation control ACC is in execution or not is determined. If the determination result at step S1201 is Yes, the process moves to step S1202, and, if the determination result is No, the process moves to step S1203.

At step S1202, the first target throttle opening APSC is obtained according to the following equation (8) by adding the ACC feedback quantity ACC_FB to the target APS (ACC) base quantity APSC_OPN, and then, the first target throttle opening APSC is limited between the lower limit value of 0 [V] and the upper limit value of 5 [V]. The first target throttle opening APSC computed at step S1202 is a throttle opening for the constant velocity navigation control ACC.

$$APSC = APSC\_OPN + ACC\_FB \quad (8)$$

Note that the ACC_FB is ACC_FB (port) or ACC_FB (Stbd).

At step S1203, the first target throttle opening APSC is set to 5 [V]. The 5 [V] set at step S1203 is a throttle opening continuously having a larger value than the second target throttle openings APSL (Port) and APSL (Stbd) calculated in the second computation means 420.

The target APS (ACC) setting unit (Port) 204 outputs the first target throttle opening APSC set at steps S1202, S1203 as the first target throttle opening APSC (Port) for the port 20P. The target APS (ACC) setting unit (Stbd) 304 outputs the first target throttle opening APSC set at steps S1202, S1203 as the first target throttle opening APSC (Stbd) for the starboard 20S.

Both the target APS (ACC) setting unit (Port) 204 and the target APS (ACC) setting unit (Stbd) 304 execute step S1202 when the ACC execution flag ACCF is at level 1, i.e., the constant velocity navigation control ACC is executed, and output the first target throttle openings APSC obtained at step S1202. When the ACC execution flag ACCF is at level 0, at step S1203, the first target throttle opening APSC is set to 5 [V].

(4K) Explanation of Overall Operation of First Computation Means 410

In the first computation means 410, under the condition that the respective engines 21 of the port 20P and the starboard 20S are operated, the target ship velocity setting unit 100, the target Ne base quantity setting unit 102, the target Ne setting unit 104, and the target APS (ACC) base quantity setting unit 105 continuously operate.

On the other hand, the ship velocity deviation F/B quantity computing unit 103, the Ne deviation F/B quantity computing units (Port) 203, 303, and the target APS (ACC) setting units (Port) 204, 304, when the ACC execution flag ACCF is at level 1, output the feedback quantities Ne_FB for the engine revolution velocities, the ACC feedback quantities ACC_FB, and the first target throttle openings APSC for the constant velocity navigation control ACC, respectively, and, when the ACC execution flag ACCF is at level 0, the feedback quantity Ne_FB for the engine revolution velocity from the ship velocity deviation F/B quantity computing unit 103 and the ACC feedback quantities ACC_FB from the Ne deviation F/B quantity computing units 203, 303 are set to 0 [V], and the first target throttle openings APSC from the target APS (ACC) setting units 204, 304 are set to 5 [V].

(5) Explanation of Second Computation Means 420

Next, the second computation means 420 will be explained with reference to FIGS. 2, 13, 13A, 13B and 13C. The second computation means 420 has the target APS (Lever) calculating unit (Port) 202 and the target APS (Lever) calculating unit (Stbd) 302. The target APS (Lever) calculating unit (Port) 202 receives the lever operation amount LPS (Port) for the port 20P output from the lever operation amount detecting unit 15P attached to the lever member 14P of the operation lever 14, computes the second target throttle opening APSL (Port) for the port 20P, and outputs the second target throttle opening APSL (Port). Similarly, the target APS (Lever) calculating unit (Stbd) 302 receives the lever operation amount LPS (Stbd) for the starboard 20S output from the lever operation amount detecting unit 15S attached to the lever member 14S of the operation lever 14, computes the second target throttle opening APSL (Stbd) for the starboard 20S, and outputs the second target throttle opening APSL (Stbd).

Figure 13:
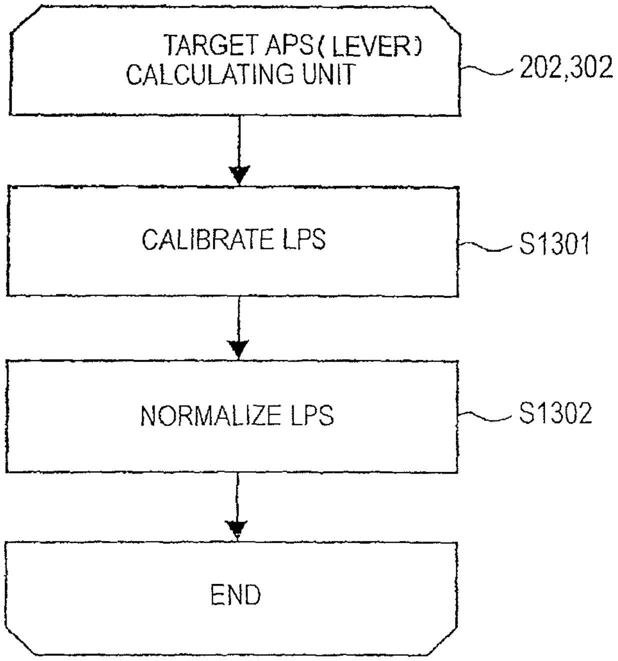
FIG. 13 is a flowchart showing a target APS (lever) calculating unit of the second computation means in the navigation control portion of embodiment 1.

The target APS (Lever) calculating unit (Port) 202 and the target APS (Lever) calculating unit (Stbd) 302 have the same configuration. FIG. 13 shows a flowchart of the target APS (Lever) calculating unit (Port) 202 and the target APS (Lever) calculating unit (Stbd) 302. This flowchart is also repeatedly executed at time intervals of 5 [msec]. As shown in FIG. 13, the target APS (Lever) calculating unit (Port) 202 and the target APS (Lever) calculating unit (Stbd) 302 have the LPS calibration step S1301 and the LPS normalization step S1302. The LPS calibration step S1301 is executed, and then, the LPS normalization step S1302 is executed.

Figure 13A:
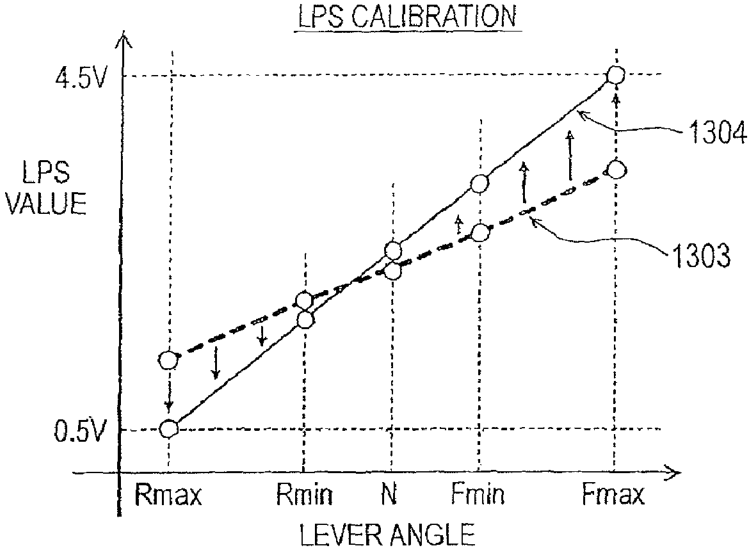
FIG. 13A is a graph for explanation of an LPS calibration operation of the target APS (lever) calculating unit.

FIG. 13A is an explanation diagram of an LPS calibration operation by the LPS calibration step S1301. In FIG. 13A, the vertical axis indicates an LPS value and the horizontal axis indicates a lever angle. The LPS value at the vertical axis represents values of a lever operation amount LPS (Port) and a lever operation amount LPS (Stbd), and specifically, takes a value from 0.5 to 4.5 [V]. The lever angle at the horizontal axis represents the operation angle of the lever members 14P, 14S of the operation lever 14. A characteristic 1303 shown by a dotted line in FIG. 13A represents an input value for the LPS calibration step S1301, and this represents the lever operation amount LPS (Port) and the lever operation amount LPS (Stbd) output from the lever operation amount detecting units 15P, 15S. A characteristic 1304 shown by a solid line in FIG. 13A is an LPS center characteristic and represents an ideal characteristic. Since the lever operation amount LPS (Port) and the lever operation amount LPS (Stbd) output from the lever operation amount detecting units 15P, 15S often include their characteristic variations and errors due to attachment of the lever operation amount detecting units 15P, 15S, at the LPS calibration step S1301, the characteristic 1303 is calibrated to the LPS center characteristic 1304.

At the LPS calibration step S1301, as shown in FIG. 13A, interpolation computation is performed on the input value shown by the characteristic 1303 and learning values of the lever position registered in advance, and the characteristic 1303 is calibrated to the LPS center characteristic 1304. For the learning values of the lever positions, the learning values in the rearward fully opened positions Rmax, the rearward fully closed positions Rmin, the neutral positions N, the forward fully opened positions Fmax, and the forward fully closed positions Fmin of the lever members 14P, 14S of the operation lever 14 are used. The rearward fully opened positions Rmax correspond to the positions where the gear mechanisms of the respective engines 21 of the port 20P and the starboard 20S are located in the rearward positions and their throttles are fully opened. The rearward fully closed positions Rmin correspond to the positions where the gear mechanisms of the respective engines 21 are located in the rearward position and their throttles are fully closed. The neutral positions N correspond to the positions where the gear mechanisms of the respective engines 21 are the neutral position N. The forward fully closed positions Fmin correspond to the positions where the gear mechanisms of the respective engines 21 are located in the forward positions and their throttles are fully closed. The forward fully opened positions Fmax correspond to the positions where the gear mechanisms of the respective engines 21 are located in the forward positions and their throttles are fully opened. The LPS center characteristic 1304 specifically has the LPS value from 0.5 [V] to 4.5 [V].

Figure 13B:
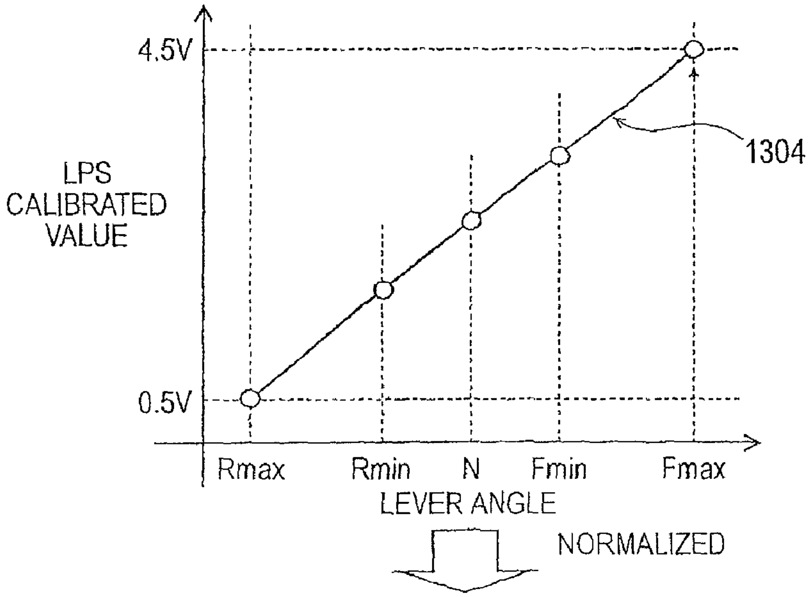
FIGS. 13B and 13C are graphs for explanation of an LPS normalization operation of the target APS (lever) calculating unit.
Figure 13C:
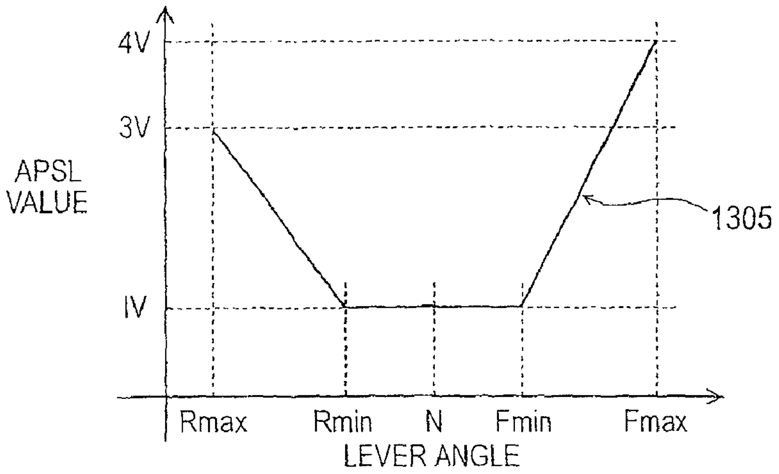

FIGS. 13B and 13C are explanation diagrams of a normalization operation by the normalization step S1302. FIG. 13B shows the LPS center characteristic 1304 obtained in FIG. 13A and FIG. 13C shows a normalization characteristic 1305. The vertical axis of FIG. 13B indicates the LPS calibration value, and the horizontal axis indicates the lever angle. The LPS calibration value indicated by the vertical axis of FIG. 13B specifically takes a value from 0.5 to 4.5 [V], and the lever angle indicated by the horizontal axis is the same as the horizontal axis of FIG. 13A. The LPS center characteristic 1304 is the same as that of FIG. 13A. In FIG. 13C, the vertical axis indicates an APSL value, and the horizontal axis indicates the lever angle. The APSL value of the vertical axis represents the values of the second target throttle opening APSL (Port) and the second target throttle opening APSL (Stbd) output from the target APS (Lever) calculating unit (Port) 202 and the target APS (Lever) calculating unit (Stbd)

302. The lever angle at the horizontal axis of FIG. 13C is the same as the lever angles of FIGS. 13A and 13B.

Specifically, the normalization characteristic 1305 of FIG. 13C is normalized to take a value that decreases with the increase of the lever angle from 3 [V] to 1 [V] between the rearward fully opened position Rmax and the rearward fully closed position Rmin, hold 1 [V] between the rearward fully closed position Rmin and the forward fully closed position Fmin, and take a value that increases with the increase of the lever angle from 1 [V] to 4 [V] between the forward fully closed position Fmin and the forward fully opened position Fmax. Note that the APSL value in the rearward fully opened position Rmax is set to 3 [V] for hazard prevention.

The second target throttle opening APSL (Port) and the second target throttle opening APSL (Stbd) output from the target APS (Lever) calculating unit (Port) 202 and the target APS (Lever) calculating unit (Stbd) 302 are not only used in the throttle control means 400 but supplied to the shift control means 500.

(6) Explanation of Select and Output Means 430

Next, the select and output means 430 will be explained with reference to FIG. 2. The select and output means 430 has final APS setting units 205, 305, an APS (Port) output unit 206, and an APS (Stbd) output unit 306. The final APS setting unit 205 outputs a final throttle opening APS (Port) for the port 20P to the APS (Port) output unit 206, and the APS (Port) output unit 206 outputs the final throttle opening APS (Port) to the engine control module 24 of the port 20P. The final APS setting unit 305 outputs a final throttle opening APS (Stbd) for the starboard 20S to the APS (Stbd) output unit 306, and the APS (Stbd) output unit 306 outputs the final throttle opening APS (Stbd) to the engine control module 24 of the starboard 20S.

The final APS setting unit 205 receives the first target throttle opening APSC (Port) from the target APS (ACC) setting unit (Port) 204 and the second target throttle opening APSL (Port) from the target APS (Lever) calculating unit (Port) 202, and selects one having the smaller value of them, and outputs it as the final throttle opening APS (Port). The first target throttle opening APSC (Port) has a value between 0 [V] to 5 [V] when the constant velocity navigation control ACC is executed, i.e., the ACC execution flag ACCF is at level 1, and is set to 5 [V] when the constant velocity navigation control ACC is not executed, i.e., the ACC execution flag ACCF is at level 0. On the other hand, the second target throttle opening APSL (Port) has a value between 1 [V] to 4 [V] when the gear position of the engine 21 of the port 20P is located in the forward position, i.e., located between the forward fully opened position Fmax and the forward fully closed position Fmin. The final APS setting unit 205 compares the first target throttle opening APSC (Port) and the second target throttle opening APSL (Port), selects one having the smaller value of them, and outputs it as the final throttle opening APS (Port).

Similarly, the final APS setting unit 305 receives the first target throttle opening APSC (Stbd) from the target APS (ACC) setting unit (Stbd) 304 and the second target throttle opening APSL (Stbd) from the target APS (Lever) calculating unit (Stbd) 302, and selects one having the smaller value of them, and outputs it as the final throttle opening APS (Stbd). The first target throttle opening APSC (Stbd) has a value between 0 [V] to 5 [V] when the constant velocity navigation control ACC is executed, i.e., the ACC execution flag ACCF is at level 1, and is set to 5 [V] when the constant velocity navigation control ACC is not executed, i.e., the ACC execution flag ACCF is at level 0. On the other hand, the second target throttle opening APSL (Stbd) has a value between 1 [V] to 4 [V] when the gear position of the engine 21 of the starboard 20S is located in the forward position, i.e., located between the forward fully opened position Fmax and the forward fully closed position Fmin. The final APS setting unit 305 compares the first target throttle opening APSC (Stbd) and the second target throttle opening APSL (Stbd), selects one having the smaller value of them, and outputs it as the final throttle opening APS (Stbd).

(7) Explanation of Overall Operation of Throttle Control Means 400

The constant velocity navigation control ACC is executed under the condition that the shift positions of the respective engines 21 of the port 20P and the starboard 20S are set to the forward positions F, for example. When the constant velocity navigation control ACC is executed, the lever members 14P, 14S of the operation lever 14 are operated to the forward fully opened positions Fmax, and the second target throttle openings APSL (Port), APSL (Stbd) are set to a value near 4 [V]. Accordingly, both the first target throttle openings APSC (Port), APSC (Stbd) have the smaller values than those of the second target throttle openings APSL (Port), APSL (Stbd), and thus, the final APS setting units 205, 305 select the first target throttle openings APSC (Port), APSC (Stbd), respectively, and the APS (Port) output unit 206 and the APS (Stbd) output unit 306 select the first target throttle openings APSC (Port), APSC (Stbd), respectively, and output the first target throttle openings APSC (Port), APSC (Stbd) as the final throttle openings APS (Port), APS (Stbd). When the constant velocity navigation control ACC is executed, the first target throttle openings APSC (Port), APSC (Stbd) are throttle openings computed at step S1202 of FIG. 12.

When the constant velocity navigation control ACC is executed, if an emergency that a player towed by the ship 10 falls into the water, for example, happens, the operator operates the respective lever members 14P, 14S of the operation lever 14 at the same time toward the fully closed positions of the throttle openings. In this case, the ACC switch 191 is not operated again, the ACC latch switch signal ACC-LT continues the state of issuing the constant velocity navigation command ACCI, and the lever operation amounts LPS (Port), LPS (Stbd) of the lever operation amount detecting units 15P, 15S decrease toward the minimum value 0.5 [V].

In the decreasing process of the lever operation amounts LPS (Port), LPS (Stbd), the second target throttle opening APSL (Port), APSL (Stbd) output from the target APS (Lever) calculating unit (Port) 202 and the target APS (Lever) calculating unit (Stbd) 302 take the smaller values than those of the first target throttle opening APSC (Port), APSC (Stbd), respectively, and consequently, the final APS setting unit 205, 305 select the second target throttle openings APSL (Port), APSL (Stbd) in place of the first target throttle openings APSC (Port), APSC (Stbd). Accordingly, the outputs of the APS (Port) output unit 206 and the APS (Stbd) output unit 306 decrease according to the decrease of the lever operation amounts LPS (Port), LPS (Stbd), and the emergency can be handled.

In the emergency, if the lever members 14P, 14S of the operation lever 14 are operated toward the fully closed positions of the throttle openings, in the first computation means 410, the target ship velocity setting unit 100, the target Ne base quantity setting unit 102, the target Ne setting unit 104, and the target APS (ACC) base quantity setting unit 105 continue their operation.

The ship velocity deviation F/B quantity computing unit 103, the Ne deviation F/B quantity computing units 203, 303, and the target APS (ACC) setting units 204, 304 output the feedback quantities Ne_FB for the engine revolution speed, the ACC feedback quantities ACC_FB, and the first target throttle openings APSC for the constant velocity navigation control ACC, respectively, when the ACC execution flag ACCF at level 1. However, in the emergency, in the process that the lever operation amounts LPS (Port), LPS (Stbd) decrease, if both of the determination results at step S901 and S902 of FIG. 9 are No, the ACC control zone ACC-CZN is at level 0, and accordingly, the determination result at step S1001 of FIG. 10 is No, and the ACC execution flag ACCF is at level 0. The ACC execution flag ACCF is at level 0 after the final APS setting units 205, 305 select the second target throttle openings APSL (Port), APSL (Stbd) in place of the first target throttle openings APSC (Port), APSC (Stbd).

When the ACC execution flag ACCF is at level 0, the ship velocity deviation F/B quantity computing unit 103 and the Ne deviation F/B quantity computing units 203, 303 stop the computation operation of the feedback quantities for the constant velocity navigation control ACC, and the feedback quantity Ne_FB for the engine revolution speed from the ship velocity deviation F/B quantity computing unit 103 and the ACC feedback quantities ACC_FB from the Ne deviation F/B quantity computing units 203, 303 are set to 0 [V]. Further, the target APS (ACC) setting units 204, 304 stop the computation of the first target throttle openings for the constant velocity navigation control ACC at step S1202 of FIG. 12, and the first target throttle openings APSC is set to 5 [V] at step S1203. Since the first target throttle openings APSC of 5 [V] continuously have the larger value than the second target throttle openings, the final APS setting units 205, 305 continue the state of selecting the second target throttle openings APSL (Port), APSL (Stbd).

The ACC execution flag ACCF is at level 0, and, as a result, under the condition that the lever operation amounts LPS (Port), LPS (Stbd) are decreased, unnecessary and unstable operation of the ship velocity deviation F/B quantity computing unit 103, the Ne deviation F/B quantity computing units 203, 303, and the target APS (ACC) setting units 204, 304 can be resolved.

After dealing with the emergency is ended, the lever members 14P, 14S of the operation lever 14 are operated by the operator so that the lever operation amounts LPS (Port), LPS (Stbd) may increase toward the maximum value 4.5 [V]. In the increasing process of the lever operation amounts LPS (Port), LPS (Stbd), first, because of the increase of the lever operation amounts LPS (Port), LPS (Stbd) and the increase of the real engine revolution velocities Ne (port), Ne (Stbd) of the port 20P and the starboard 20S, the determination results of step S901 and/or step S902 of the execution state determining unit 110 become Yes, the ACC control zone ACC-CZN is returned to level 1, and the ACC execution flag ACCF is returned to level 1 in the execution condition determining unit 111.

Accordingly, in the first computation means 410, the ship velocity deviation F/B quantity computing unit 103, the Ne deviation F/B quantity computing unit (Port) 203, and the Ne deviation F/B quantity computing unit (Stbd) 303 restart the computation operation for the constant velocity navigation control ACC, and the target APS (ACC) setting unit (Port) 204 and the target APS (ACC) setting unit (Stbd) 304 output the first target throttle openings APSC (Port), APSC (Stbd) for the constant velocity navigation control ACC from step S1202.

After the ACC execution flag ACCF is returned to level 1, because of the increase of the lever operation amounts LPS (Port), LPS (Stbd), the second target throttle openings APSL (Port), APSL (Stbd) output from the target APS (Lever) calculating unit (Port) 202 and the target APS (Lever) calculating unit (Stbd) 302 have the larger values than those of the first target throttle openings APSC (Port), APSC (Stbd), respectively, and consequently, the final APS setting units 205, 305 select the first target throttle openings APSC (Port), APSC (Stbd) in place of the second target throttle opening APSL (Port), APSL (Stbd) and the constant velocity navigation control ACC is restarted.

Accordingly, the outputs APS (Port), APS (Stbd) of the APS (Port) output unit 206 and the APS (Stbd) output unit 306 rise according to the increase of the lever operation amounts LPS (Port), LPS (Stbd), and, as a result of the selection of the first target throttle openings APSC (Port), APSC (Stbd), the rise is suppressed by the first target throttle openings APSC (Port), APSC (Stbd). Thus, rapid rising of the outputs APS (Port), APS (Stbd) of the APS (Port) output unit 206 and the APS (Port) output unit 306 to the maximum values after dealing with the emergency can be suppressed.

(8) Explanation of Shift Control Means 500

Finally, the shift control means 500 will be explained with reference to FIGS. 2, 13B, and 13C. As shown in FIG. 2, the shift control means 500 includes an SSP (Port) output unit 501 that outputs the shift position for the port 20P and an SSP (Stbd) output unit 502 that outputs the shift position for the starboard 20S. The SSP (Port) output unit 501 receives the second target throttle opening APSL (Port) from the target APS (Lever) calculating unit (Port) of the second computation mean 420. The SSP (Stbd) output unit 502 receives the second target throttle opening APSL (Stbd) from the target APS (Lever) calculating unit (Stbd) of the second computation means 420.

The second target throttle openings APSL (Port), APSL (Stbd) are shown by the characteristic 1305 in FIG. 13C. The characteristic 1305 includes the lever positions Rmax, Rmin, N, Fmin, and Fmax. The SSP (Port) output unit 501 and the SSP (Stbd) output unit 502 output the shift positions based on the lever positions Rmax, Rmin, N, Fmin, and Fmax included in the characteristic 1305. The shift positions are set to the rearward positions R between the lever positions Rmax and Rmin, the shift positions are set to the neutral positions N between the lever positions Rmin and Fmin, and the shift positions are set to the forward positions between the lever positions Fmin and Fmax.

The ship navigation control system according to the invention is used for a ship including an outboard motor containing an engine.

Various modifications and alterations of this invention will be apparent to those skilled in the art without departing from the scope and spirit of this invention, and it should be understood that this is not limited to the illustrative embodiments set forth herein.

What is claimed is:

1. In a navigation control system for a ship including a ship body having an operator seat, and at least one outboard motor containing an engine, the outboard motor has a throttle actuator that controls a throttle opening of the engine and an engine control module that controls the throttle actuator, the ship body is provided with a ship control module connected to the engine control module, a ship velocity detecting unit that generates a ship velocity signal representing a ship velocity of the ship body, a constant velocity navigation commanding unit that generates a constant velocity navigation command, a target ship velocity commanding unit that outputs a target ship velocity command signal, and an operation lever that controls the throttle opening of the engine, the constant velocity navigation commanding unit, the target ship velocity commanding unit, and the operation lever are placed near the operator seat for operation by the operator, the operation lever is provided with a lever operation amount detecting unit that detects a lever operation amount, the ship velocity detecting unit, the constant velocity navigation commanding unit, the target ship velocity commanding unit, and the lever operation amount detecting unit are connected to the ship control module, the ship control module includes a throttle control means that controls the throttle actuator through the engine control module, and the throttle control means includes first computation means that computes a first target throttle opening for a constant velocity navigation control of the ship based on the constant velocity navigation command using at least the ship velocity signal and the target ship velocity command signal, second computation means that computes a second target throttle opening corresponding to the lever operation amount, and selection and output means that selects one having a smaller value of the first target throttle opening and the second target throttle opening and outputs the one as a throttle opening.

2. In the navigation control system of the ship according to claim 1, wherein, in the throttle control means, under a condition that the first target throttle opening is selected and the constant velocity navigation control is performed on the engine, when the operation lever is operated to a deceleration side, the selection and output means operates to select the second target throttle opening.

3. In the navigation control system of the ship according to claim 2, wherein, when the operation lever is operated to the deceleration side, the selection and output means selects the second target throttle opening, and then, the first computation means stops the computation of the first throttle opening for the constant velocity navigation control of the ship and outputs a constant throttle opening having a value larger than that of the second target throttle opening.

4. In the navigation control system of the ship according to claim 2, wherein, in the throttle control means, under a condition that the second target throttle opening is selected, when the operation lever is operated to an acceleration side, the selection and output means operates to select the first target throttle opening again.

5. In the navigation control system of the ship according to claim 4, wherein, when the operation lever is operated to the deceleration side, the selection and output means selects the second target throttle opening, and then, the first computation means stops the computation of the first throttle opening for the constant velocity navigation control of the ship, and, when the operation lever is operated to the acceleration side, the first computation means restarts the computation of the first target throttle opening for the constant velocity navigation control of the ship, and then, the selection and output means selects the first target throttle opening again.

6. In the navigation control system of the ship according to claim 1, wherein the first computation means computes the first target throttle opening using a characteristic map representing a relation between the ship velocity and a number of revolutions of the engine.

7. In the navigation control system of the ship according to claim 1, wherein the navigation control system comprises plural outboard motors each having the engine, each of the outboard motors has the throttle actuator that controls the throttle opening of the engine and the engine control module that controls the throttle actuator, and the throttle control means of the ship control module controls the throttle actuator through the engine control module of each of the outboard motors.

* * * * *